(12) United States Patent
Schorn et al.

(10) Patent No.: US 11,878,810 B2
(45) Date of Patent: Jan. 23, 2024

(54) AUXILIARY POWER SYSTEMS, AIRCRAFT INCLUDING THE SAME, AND RELATED METHODS

(71) Applicant: The Boeing Company, Chicago, IL (US)

(72) Inventors: Scott Schorn, Langley, WA (US); John Carl Szillat, Bellevue, WA (US); David Scott Krug, Woodinville, WA (US); Paul R. Tretow, Seattle, WA (US); Keith Douglas Choyke, Everett, WA (US); Royal E. Boggs, North Charleston, SC (US); Angela O'Gorman, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/698,525

(22) Filed: Mar. 18, 2022

(65) Prior Publication Data
US 2022/0204179 A1 Jun. 30, 2022

Related U.S. Application Data

(63) Continuation-in-part of application No. 16/238,983, filed on Jan. 3, 2019, now Pat. No. 11,279,490.

(51) Int. Cl.
B64D 41/00 (2006.01)
F02C 6/08 (2006.01)
(Continued)

(52) U.S. Cl.
CPC ............. B64D 41/00 (2013.01); B64D 13/06 (2013.01); F02C 6/08 (2013.01); F02C 7/32 (2013.01); *B64D 2013/0611* (2013.01); *B64D 2013/0618* (2013.01); *B64D 2033/0213* (2013.01); *F05D 2220/50* (2013.01)

(58) Field of Classification Search
CPC ............. F02C 6/08; B64D 2013/0611; B64D 2013/0618; F05D 2220/50
See application file for complete search history.

(56) References Cited

U.S. PATENT DOCUMENTS 4,318,509 A * 3/1982 Patrick ................. G05D 23/185
236/80 A
6,306,032 B1 10/2001 Scheffler et al.
(Continued)

*Primary Examiner* — Katheryn A Malatek
(74) *Attorney, Agent, or Firm* — Kolitch Romano Dascenzo Gates LLC

(57) ABSTRACT

Auxiliary power systems, aircraft including the same, and related methods are disclosed herein. In one embodiment, the aircraft includes an airframe and an auxiliary power system that includes an auxiliary power unit (APU), an APU controller, and a bleed air temperature (BAT) sensor. The APU defines a bleed air outlet and is configured to regulate a BAT of a bleed air flow generated by the auxiliary power unit. The BAT sensor is positioned at a remote BAT location that is outside the bleed air outlet of the APU. In another embodiment, the auxiliary power system includes an APU configured to generate a bleed air flow, an APU controller configured to receive and transmit signals, and a BAT sensor suite configured to measure the BAT of the bleed air flow and to generate a BAT signal that is based, at least in part, on the BAT.

20 Claims, 8 Drawing Sheets

(51) Int. Cl.
   *F02C 7/32*   (2006.01)
   *B64D 13/06*  (2006.01)
   *B64D 33/02*  (2006.01)

(56) References Cited

U.S. PATENT DOCUMENTS

| | | | |
|---|---|---|---|
| 6,485,255 B1* | 11/2002 | Care | F01D 25/12 |
| | | | 415/12 |
| 6,845,627 B1 | 1/2005 | Buck | |
| 2003/0028345 A1* | 2/2003 | Watkins | G01K 15/00 |
| | | | 374/E7.007 |
| 2010/0101209 A1 | 4/2010 | Feher et al. | |
| 2013/0098051 A1 | 4/2013 | Valdez et al. | |
| 2015/0096359 A1* | 4/2015 | Catt | F02C 9/00 |
| | | | 73/112.01 |
| 2018/0112602 A1* | 4/2018 | Collins | F02C 9/28 |
| 2018/0334918 A1* | 11/2018 | Ortiz | F01D 17/145 |
| 2019/0285324 A1* | 9/2019 | Valiquette | B64D 13/06 |
| 2020/0216180 A1 | 7/2020 | Szillat et al. | |

\* cited by examiner

AUXILIARY POWER SYSTEMS, AIRCRAFT INCLUDING THE SAME, AND RELATED METHODS

RELATED APPLICATION

The present application is a continuation-in-part of and claims priority to U.S. patent application Ser. No. 16/238,983, which was filed on Jan. 3, 2019, which is entitled "AUXILIARY POWER SYSTEMS, AIRCRAFT INCLUDING THE SAME, AND RELATED METHODS," which issued as U.S. Pat. No. 11,279,490 on Mar. 22, 2022, and the complete disclosure of which is hereby incorporated by reference.

FIELD

The present disclosure relates to auxiliary power systems, aircraft including the same, and related methods.

BACKGROUND

An auxiliary power unit (APU) generally is an engine, such as a gas turbine engine, that produces outputs such as torque, electricity, and/or pressurized air to be utilized by a vehicle that carries the APU. For example, many aircraft include APUs to provide a pressurized bleed air flow to operate various aircraft systems. In such examples, it generally is desirable to keep a temperature of the bleed air flow below a threshold bleed air temperature to ensure proper operation of the systems that utilize the bleed air flow. Traditional APUs may regulate the temperature of the bleed air flow indirectly, such as by regulating a flow rate to a load compressor that generates the bleed air flow, with a reduction in flow rate generally corresponding to a lower bleed air pressure and/or temperature. The flow rate to the load compressor generally is regulated in accordance with system demands of the vehicle. In some cases, the APU also may reduce the flow rate to the load compressor responsive to a measured temperature of a gas turbine exhaust gas. For example, the APU may reduce the flow rate to the load compressor responsive to the measured exhaust gas temperature exceeding a predetermined threshold temperature. In this manner, regulating the flow rate to the load compressor responsive to the measured exhaust gas temperature may serve to protect components of the APU and/or the vehicle from damage, such as by effectively limiting a maximum temperature of the bleed air flow. However, in aircraft that have been operated extensively and/or in extreme environmental conditions, the exhaust gas temperature and the bleed air temperature may become increasingly uncorrelated, such that measurement of the exhaust gas temperature alone may not enable precise control of the bleed air temperature.

SUMMARY

Auxiliary power systems, aircraft including the same, and related methods are disclosed herein. In one embodiment, the aircraft includes an airframe and an auxiliary power system that includes an auxiliary power unit (APU), an APU controller, and a bleed air temperature (BAT) sensor. The APU is structurally supported by the airframe, defines a bleed air outlet, and is configured to regulate a bleed air temperature (BAT) of a bleed air flow generated by the auxiliary power unit. The APU controller is configured to receive and transmit signals. The BAT sensor is configured to measure a bleed air temperature of the bleed air flow and to generate a BAT signal that is based, at least in part, on the bleed air temperature. The aircraft includes a bleed air consumer, which is configured to receive at least a subset of the bleed air flow from the APU, and a bleed air conduit, which is configured to convey the bleed air flow from the bleed air outlet to the bleed air consumer. The BAT sensor is positioned at a remote BAT location that is outside the bleed air outlet of the APU.

In another embodiment, the auxiliary power system includes an auxiliary power unit (APU) configured to generate a bleed air flow, an APU controller configured to receive and transmit signals, and a bleed air temperature (BAT) sensor configured to measure the bleed air temperature of the bleed air flow and to generate a BAT signal that is based, at least in part, on the bleed air temperature. The BAT sensor includes a BAT sensor suite that includes a BAT magnitude sensor in thermal communication with the bleed air flow and a BAT thermal switch in thermal communication with the bleed air flow. The BAT magnitude sensor is configured to generate a BAT magnitude sensor signal that is indicative of the bleed air temperature. The BAT thermal switch is configured to generate a BAT thermal switch signal that has a low-temperature output value when the bleed air temperature is less than a threshold BAT range and a high-temperature output value, which differs from the low-temperature output value, when the bleed air temperature is greater than the threshold BAT range. The BAT signal is based, at least in part, on at least one of the BAT magnitude sensor signal and the BAT thermal switch signal.

DESCRIPTION

Figure 1:
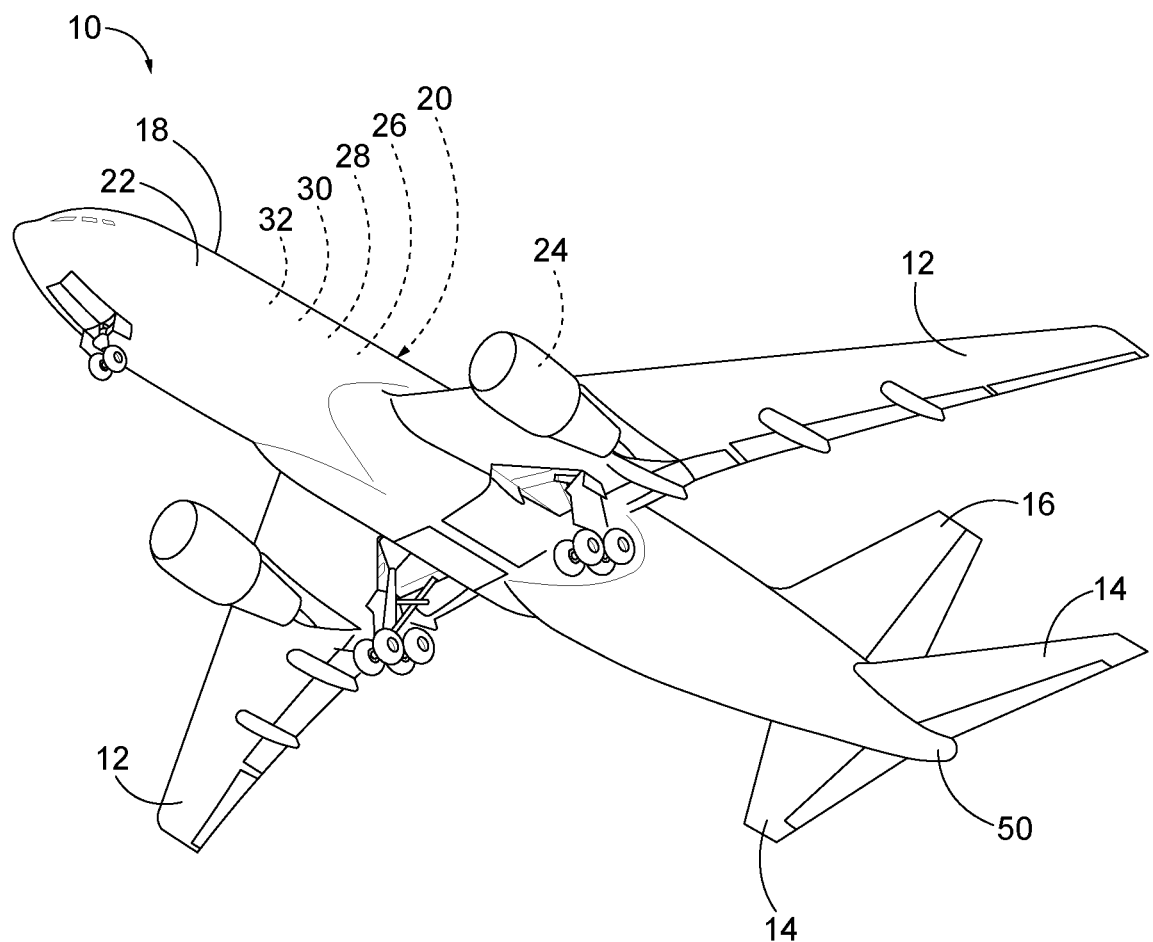
FIG. 1 is an illustration of an aircraft that may include and/or utilize auxiliary power systems and/or methods, according to the present disclosure.

FIGS. 1-11 provide illustrative, non-exclusive examples of auxiliary power systems 50 for regulating a bleed air temperature (BAT) of a bleed air flow 118, of aircraft 10 including the auxiliary power systems 50, and/or of methods 300 of utilizing an auxiliary power system 50, according to the present disclosure. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency. Elements, components, and/or features that are discussed herein with reference to one or more of FIGS. 1-11 may be included in and/or utilized with any of FIGS. 1-11 without departing from the scope of the present disclosure.

Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

FIG. 1 is an illustration of an aircraft 10 that may include and/or utilize auxiliary power systems 50 and/or methods 300, according to the present disclosure. As shown in FIG. 1, aircraft 10 may include one or more wings 12, a horizontal stabilizer 14, a vertical stabilizer 16, and/or an airframe 18 that defines an interior 22. As further shown in FIG. 1, and as described in more detail herein in conjunction with FIG. 11, aircraft 10 also may include a plurality of systems 20, such as may include a propulsion system 24, an electrical system 26, a hydraulic system 28, an environmental system 30, and/or a pneumatic system 32. Aircraft 10 also includes an auxiliary power system 50, examples of which are disclosed herein. Examples of aircraft 10 include an airplane, a commercial aircraft, and/or a military aircraft.

Figure 2:
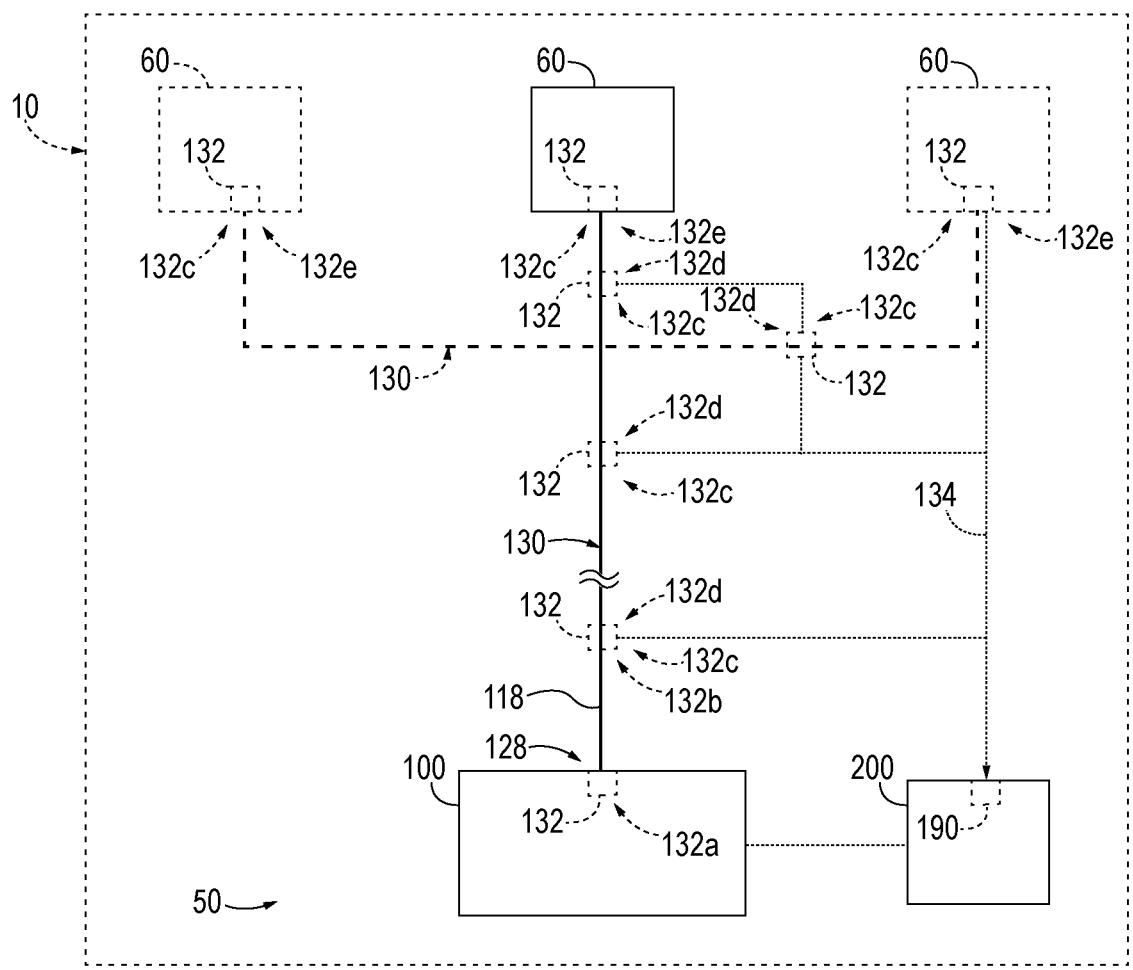
FIG. 2 is a schematic illustration of examples of an aircraft that may include and/or utilize auxiliary power systems and/or methods, according to the present disclosure.

FIG. 2 is a more schematic illustration of examples of an aircraft 10 that may include, utilize, and/or structurally support auxiliary power systems 50 and/or may perform methods 300, according to the present disclosure. As illustrated in FIG. 2, auxiliary power system 50 of aircraft 10 includes an auxiliary power unit (APU) 100 that defines a bleed air outlet 128. APU 100 is configured to generate a bleed air flow 118 and/or to discharge bleed air flow 118 via bleed air outlet 128. Auxiliary power system 50 of aircraft 10 also includes an APU controller 200 and at least one bleed air temperature (BAT) sensor 132. As discussed in more detail herein, APU controller 200 is configured to receive and/or to transmit signals; and BAT sensor 132 is configured to measure a bleed air temperature (BAT) of bleed air flow 118 and/or to generate a bleed air temperature (BAT) signal 134 that is based upon and/or indicative of the BAT. APU controller 200 may be configured to receive BAT signal 134 and/or to control the operation of APU 100 based, at least in part, on BAT signal 134, as also discussed in more detail herein.

BAT sensor 132 may be positioned, mounted, affixed, and/or supported at any suitable location within aircraft 10 and/or within auxiliary power system 50 thereof. In some examples, and as indicated in FIG. 2 at 132a, BAT sensor 132 may be positioned within APU 100, such as within bleed air outlet 128 of APU 100. In some examples, and as indicated in FIG. 2 at 132b, BAT sensor 132 may be positioned proximate APU 100, such as being at most a threshold outlet distance of bleed air outlet 128. Examples of the threshold outlet distance include distances of 2 meters (m), 1.75 m, 1.5 m, 1.25 m, 1 m, 0.75 m, 0.5 m, 0.25 m, or 0.1 m.

Figure 11:
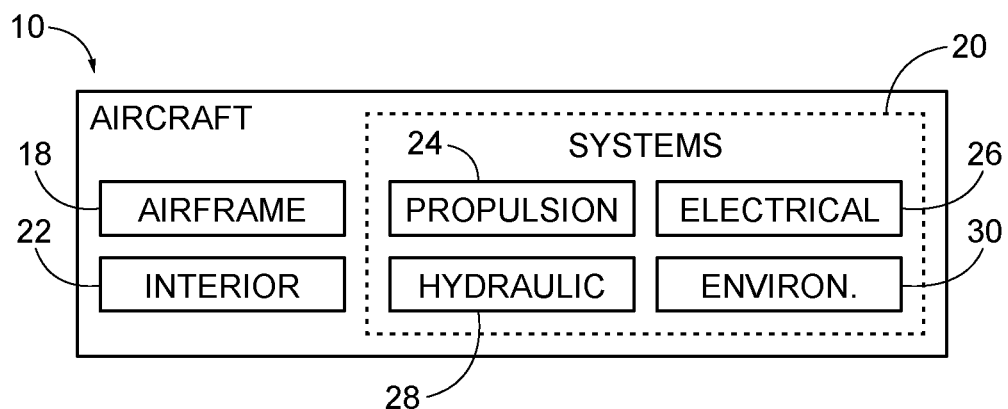
FIG. 11 is a block diagram of an aircraft.

In some examples, aircraft 10 may include at least one bleed air consumer 60. Bleed air consumer 60, when present, may include and/or be any suitable structure that may be configured to receive and/or to utilize at least a fraction of bleed air flow 118 that is generated by APU 100. Examples of bleed air consumer 60 include one or more aircraft systems configured to receive pressurized air in the form of bleed air flow 118, such as environmental systems 30 and/or pneumatic systems 32 of aircraft 10 that are illustrated in FIG. 11 and discussed in more detail herein with reference thereto. In some such examples, aircraft 10 also may include at least one bleed air conduit 130. Bleed air conduit 130 may be configured to convey bleed air flow 118 from APU 100, from bleed air outlet 128, and/or to bleed air consumer 60.

When aircraft 10 includes bleed air consumer 60 and/or bleed air conduit 130, BAT sensor 132 may be positioned at a remote BAT location 132c that is outside and/or distal from APU 100 and/or bleed air outlet 128 thereof. As an example, BAT sensor 132 may be positioned within bleed air conduit 130, as indicated at 132d. As another example, BAT sensor 132 may be positioned relatively proximate bleed air consumer 60 relative to APU 100 and/or may be positioned relative distal APU 100 relative to bleed air consumer 60. Stated differently, BAT sensor 132 may be relatively closer to bleed air consumer 60 when compared to APU 100, with the distance between BAT sensor 132 and bleed air consumer 60 and/or APU 100 being measured along a length of bleed air conduit 130. In some examples, BAT sensor 132 may be operatively attached to and/or included within bleed air consumer 60, as indicated at 132e.

In some examples, BAT sensor 132 may be at least a threshold conduit distance from bleed air outlet 128. The threshold conduit distance may be measured along the length of bleed air conduit 130. Examples of the threshold conduit distance include distances of 1 m, 1.5 m, 2 m, 2.5 m, 3 m, 3.5 m, 4 m, 4.5 m, 5 m, 5.5 m, 6 m, 8 m, 10 m, 15 m, or 20 m.

APU 100 and/or APU controller 200 may utilize BAT signal 134 from any suitable BAT sensor 132 to regulate the bleed air temperature of bleed air flow 118 in any suitable manner. This may include decreasing a flow rate of bleed air flow 118 to maintain the bleed air temperature at a target and/or desired bleed air temperature at any selected location. As an example, and when BAT sensor 132 is positioned at remote BAT location 132c, APU 100 may be configured to regulate an outlet bleed air temperature of bleed air flow 118 at bleed air outlet 128 based, at least in part, on the bleed air temperature of bleed air flow 118 at remote BAT location 132c. As another example, and when BAT sensor 132 is positioned at remote BAT location 132c, APU 100 may be configured to regulate a consumer bleed air temperature of bleed air flow 118 at one or more bleed air consumers 60 based, at least in part, on the bleed air temperature of bleed air flow 118 at remote BAT location 132c. As yet another example, and when BAT sensor 132 is positioned at remote BAT location 132c, APU 100 may be configured to regulate a consumer bleed air temperature of bleed air flow 118 at remote BAT location 132c based, at least in part, on the bleed air temperature of bleed air flow 118 at remote BAT location 132c.

In some examples, auxiliary power systems 50 and/or aircraft 10 that include auxiliary power systems 50 may include a plurality of distinct, separate, and/or spaced-apart BAT sensors 132. As an example, auxiliary power systems 50 and/or aircraft 10 may include two or more of the BAT sensors 132 that are illustrated in FIG. 2. In such examples, BAT sensors 132 may be positioned at any suitable location. As an example, at least a subset of the plurality of spaced-apart BAT sensors may be spaced-apart within and/or along a length of bleed air conduit 130, such as is indicated at 132d in FIG. 2. As another example, at least one BAT sensor 132 may be operatively attached to APU 100 and/or may be configured to measure the bleed air temperature at APU 100, such as is indicated at 132a in FIG. 2. As yet another example, at least one BAT sensor 132 may be operatively attached to and/or may be configured to measure the bleed air temperature at bleed air consumer 60, as indicate at 132e in FIG. 2.

In such examples, APU controller 200 may be configured to regulate the bleed air temperature of bleed air flow 118 based, at least in part, on a given, or a selected, BAT signal 134 of a given, or a selected BAT sensor 132 of the plurality of spaced-apart BAT sensors 132. Alternatively, APU controller 200 may be configured to regulate the bleed air temperature of bleed air flow 118 based, at least in part, on a plurality of, or a plurality of different, BAT signals 134 generated by a corresponding subset of the plurality of spaced-apart BAT sensors 132.

In some examples, and when auxiliary power systems 50 and/or aircraft 10 include the plurality of spaced-apart BAT sensors 132, APU controller 200 may be configured to verify a validity of a first BAT signal from a first BAT sensor of the plurality of spaced-apart BAT sensors 132. Stated differently, APU controller 200 may be configured to verify that the first BAT sensor is generating a first BAT signal that is, or actually is, representative of the bleed air temperature of bleed air flow 118 at the location of the first BAT sensor.

This verification may be based, at least in part on a comparison of the first BAT signal to a second BAT signal from a second BAT sensor of the plurality of spaced-apart BAT sensors 132. As a more specific example, APU controller 200 may be configured to calculate a first calculated BAT at a location of the first BAT sensor and based, at least in part, on the second BAT signal from the second BAT sensor. APU controller 200 then may be configured to determine that the first BAT signal is valid when the first BAT signal corresponds to a first BAT that is within a threshold temperature differential of the first calculated BAT. Alternatively, APU controller 200 may be configured to determine that the first BAT signal has questionable validity when the first BAT differs from the first calculated BAT by more than the threshold temperature differential. Examples of the threshold temperature differential include temperature differentials 1° C., 2° C., 3° C., 4° C., 5° C., 6° C., 8° C., or 10° C.

When APU controller 200 determines that the first BAT signal has questionable validity, APU controller 200 further may be configured to verify a validity of both the first BAT signal and the second BAT signal. This verification may be based, at least in part, on a comparison of both the first BAT signal and the second BAT signal to a third BAT signal from a third BAT sensor of the plurality of BAT sensors 132.

As illustrated in FIG. 2, aircraft 10 that include auxiliary power systems 50 may include a plurality of spaced-apart, or distinct, bleed air consumers 60. When aircraft 10 includes the plurality of spaced-apart bleed air consumers 60, APU controller 200 may be configured to regulate the bleed air temperature of bleed air flow 118 such that the bleed air temperature at a selected bleed air consumer 60 is less than a threshold bleed air temperature. Additionally or alternatively, APU controller 200 may be configured to regulate the bleed air temperature of bleed air flow 118 such that the bleed air temperature at each bleed air consumer within at least a subset of the plurality of spaced-apart bleed air consumers 60 is less than a corresponding threshold bleed air temperature. Stated differently, APU controller 200 may regulate the bleed air temperature at the selected bleed air consumer 60 at a given point in time, may regulate the bleed air temperature at several, but not all, bleed air consumers 60 at the given point in time, or may regulate the bleed air temperature at all bleed air consumers 60 at the given point in time. This regulation may include ensuring that the bleed air temperature does not exceed the corresponding bleed air temperature threshold and/or decreasing the flow rate of bleed air flow 118 when the bleed air temperature exceeds the corresponding bleed air temperature.

As discussed, APU 100 and/or APU controller 200 may regulate the bleed air temperature of bleed air flow 118 at a temperature regulation location, which may be distinct from, may be spaced-apart from, and/or may differ from a location of a given BAT sensor 132 that generates a given BAT signal 134 indicative of the bleed air temperature at the given BAT sensor 132. This may be accomplished in any suitable manner.

As an example, APU controller 200 may be configured to calculate, to estimate, and/or to determine a calculated bleed air temperature of bleed air flow 118 at the temperature regulation location. In such examples, the temperature regulation location also may be referred to herein as a calculation location, and the calculated bleed air temperature may be calculated based, at least in part, on the given BAT signal 134. In such examples, APU controller 200 also may be configured to regulate a calculation location bleed air temperature of the bleed air flow at the calculation location based, at least in part, on the calculated bleed air temperature. Stated differently, APU controller 200 may be configured to estimate the bleed air temperature at one location based, at least in part, on the bleed air temperature at a different location and to regulate the bleed air temperature at the one location utilizing information regarding the bleed air temperature at the different location.

APU controller 200 may calculate the calculated bleed air temperature in any suitable manner. As an example, APU controller 200 may calculate the calculated bleed air temperature utilizing information regarding a distance between a BAT sensor location, of the given BAT sensor 132, and the calculation location as measured along a length of bleed air conduit 130. As another example, APU controller 200 may calculate the calculated bleed air temperature utilizing information regarding an ambient temperature, such as within an ambient environment that surrounds aircraft 10, auxiliary power system 50, APU 100, and/or bleed air conduit 130. As yet another example, APU controller 200 may calculate the calculated bleed air temperature utilizing information regarding a bleed air flow rate and/or a bleed air velocity of the bleed air flow, such as within bleed air conduit 130. As another example, APU controller 200 may calculate the calculated bleed air temperature utilizing information regarding a direction of bleed air flow between the BAT sensor location and the calculation location.

Figure 3:
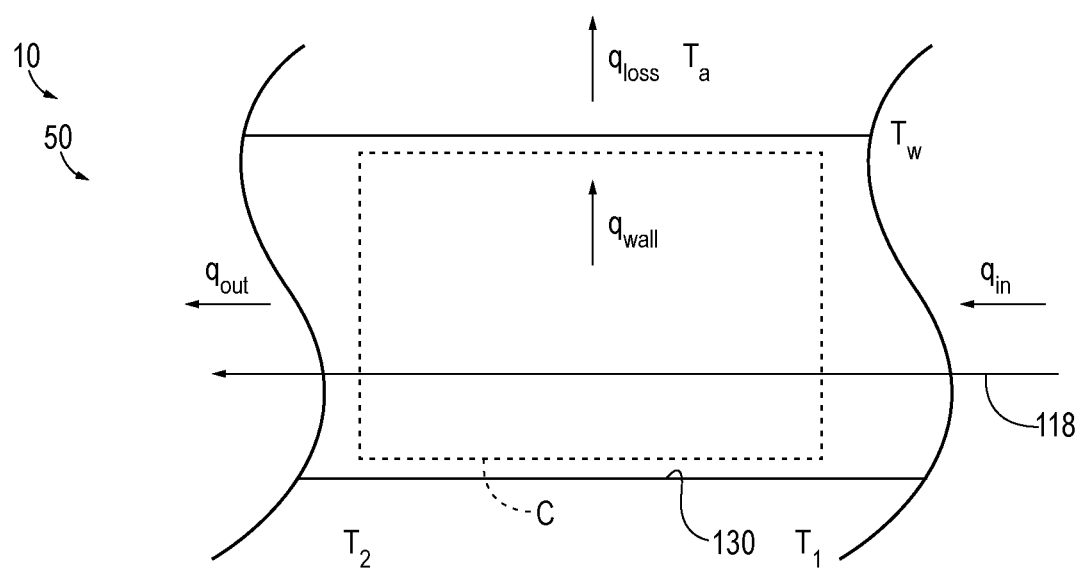
FIG. 3 is a schematic illustration of an example of a control volume that may be utilized to calculate temperatures utilized by auxiliary power systems, according to the present disclosure.

In a specific example, the calculated bleed air temperature at the calculation location may be determined utilizing numerical methods, such as flow solvers, and may be based upon heat and mass transfer within a control volume, C, that is contained within bleed air conduit 130 and through which bleed air flow 118 is conveyed, as illustrated in FIG. 3. In the example of FIG. 3, an energy balance may be utilized to show that:

$$q_{in} - q_{out} = q_{loss} \quad (1)$$

$$q_{wall} = q_{loss} \quad (2)$$

where $q_{in}$ is the convective transport of energy into the control volume, $q_{out}$ is the convective transport of energy out of the control volume, $q_{wall}$ is the heat transfer from the air to an inner duct surface (forced convection of turbulent pipe flow), and $q_{loss}$ is the heat transfer from an outer duct surface to the ambient environment, including natural convective and radiative heat transfer modes.

The bleed air system may be routed through several zones with distinct ambient conditions, typically driven by proximity to other heat generating equipment. Each zone may be treated independently with enforced boundary conditions between zones. The bleed air temperatures at a load compressor stage of APU 100 may be determined empirically with APU engine testing for a range of ambient day conditions and targeted mass flow rates and may be set by APU controller 200 based on airplane demand signals. This is the $T_1$ value for the control volume adjacent to the APU itself. $T_2$ is then may be calculated according to the procedure below for each control volume, with $T_1$ equal to $T_2$ from the adjacent upstream control volume, thereby permitting calculation of $T_1$ and/or $T_2$ at any desired location within bleed air conduit 130. Additionally or alternatively, and as discussed, $T_1$ may be measured at other locations, such as by BAT sensors 132 that are positioned at remote BAT locations 132c of FIG. 2, and a corresponding $T_2$ may be calculated.

The above heat flux terms may be defined as follows:

$$q_{in} - q_{out} = \dot{m} C_p A (T_1 - T_2) = q_{loss} \quad (3)$$

Where $\dot{m}$ is the bleed air mass flow, which may be a known value, $C_p$ is the specific heat of air, which may be determined from published values, A is the cross sectional area of bleed air conduit 130, which may be a known value.

Given the above, $T_2$ may be calculated with known inputs specified above and a calculation of $q_{loss}$ from:

$$q_{loss} = q_{rad} + q_{conv} = [\sigma \in (T_w^4 - T_a^4) + h_n (T_w - T_a)] \pi D L \quad (4)$$

Where $\sigma$ is the Stephan-Boltzmann constant, $\in$ is a emissivity constant, which may be determined from published values, $h_n$ is the (natural) convection coefficient, which may be determined from published values, D is the diameter of bleed air conduit 130, L is the length of bleed air conduit 130 between the location of $T_1$ and the location of $T_2$, $T_a$ is the ambient temperature in the compartment zone, which may be empirically determined, and $T_w$ is the duct wall temperature, which may be calculated.

$q_{loss}$ may be calculated from the known inputs specified above and a calculation of $T_w$. $T_w$ may be determined by calculating the forced convective heat transfer at the duct inner wall utilizing:

$$q_{wall} = h_f (T_b - T_w) \pi D L \quad (5)$$

Where $h_f$ is the forced convection coefficient, which may be calculated, $T_b$ is the average bleed air bulk temperature, which may be equal to $(T_1+T_2)/2$, $h_f$ may be calculated via the Nusselt number definition and its empirically determined relation to turbulent pipe flow characteristics as follows according to:

$$Nu_d = \frac{h_f D}{k} = Re_d^{0.8} Pr^{0.4} \quad (6)$$

Where $Re_d$ is the Reynolds number, which is a function of air flow velocity, Pr is the Prandtl number, which is 0.7 for air, and k is the conductive heat transfer coefficient for air, which may be determined from published values.

The above system of relations results in two independent equations for two unknown values, $T_2$ and $T_w$. For extended steady state operations it may be assume that $T_w$ is constant through its thickness. Temperature predictions subsequently may be validated via comparison to airplane level test measurements, with adjustments applied to $h_f$ values utilized to adjust the predictions, as required.

Figure 4:
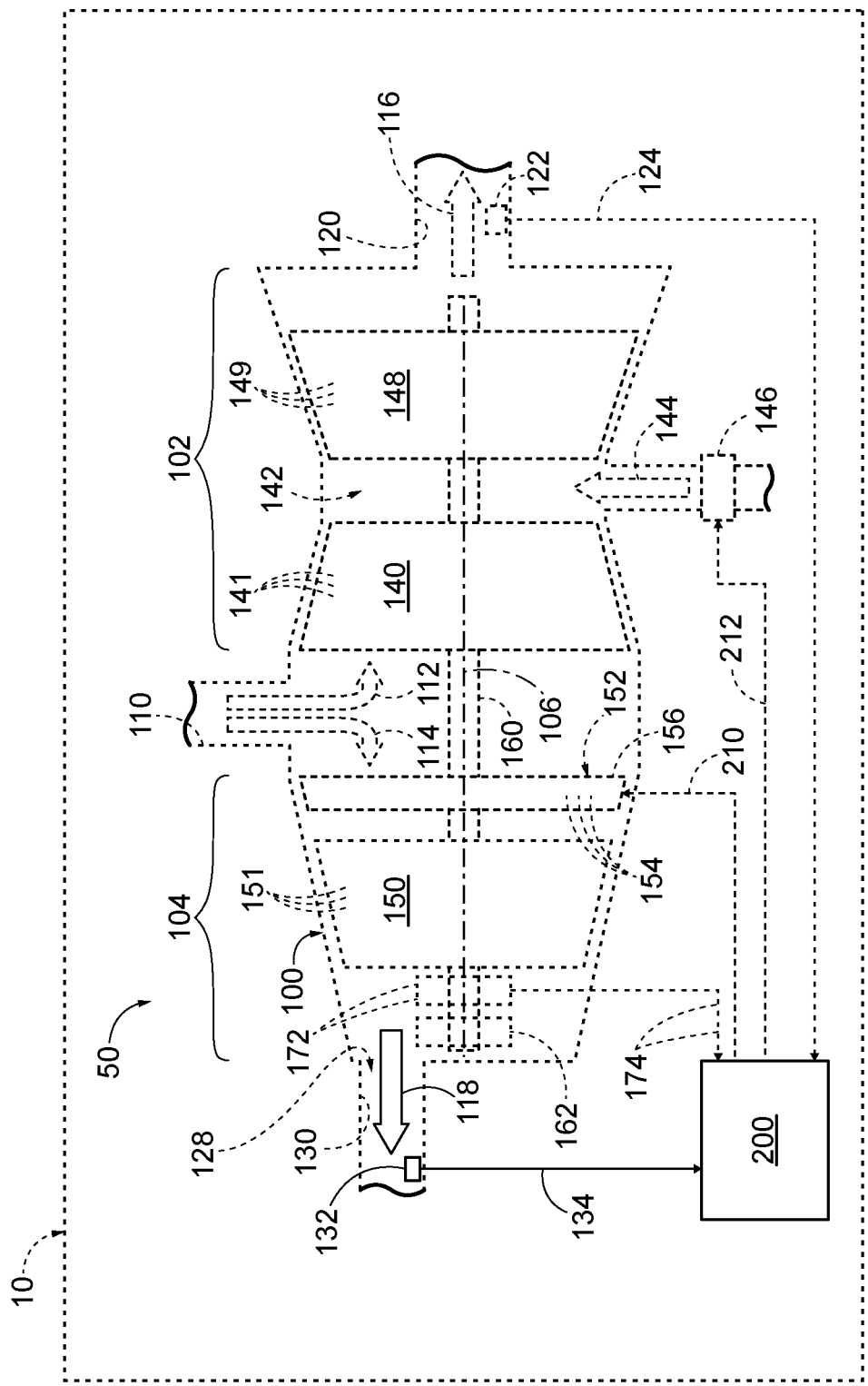
FIG. 4 is a schematic illustration of examples of auxiliary power systems according to the present disclosure.

FIG. 4 schematically illustrates examples of auxiliary power systems 50 according to the present disclosure, such as may be included in and/or structurally supported by aircraft 10. As schematically illustrated in FIG. 4, an auxiliary power system 50 includes an auxiliary power unit (APU) 100 configured to generate a bleed air flow 118 as well as an APU controller 200 configured to receive and transmit signals. APU 100 may include and/or exhibit any appropriate APU design, configuration, and/or functionality, such as may be known in the art of APU design, APU manufacture, APU operation, and/or aviation. For example, APU 100 may be configured to generate bleed air flow 118 to serve as a source of pressurized air, such as may be utilized by one or more systems 20 of aircraft 10, such as environmental system 30, as illustrated in FIG. 11. In some examples, and as schematically illustrated in FIG. 4, APU 100 also may include a generator 162 configured to generate electrical power, such as may be utilized by one or more systems 20 of aircraft 10, such as electrical system 26. In an example in which bleed air flow 118 is utilized by one or more systems 20, it may be desirable to maintain a temperature of bleed air flow 118 below a threshold temperature to ensure desired and/or optimal operation of systems 20 that utilize bleed air flow 118. Accordingly, and as described herein, auxiliary power systems 50 generally are configured to regulate a temperature of bleed air flow 118, such as by maintaining the temperature of bleed air flow 118 below a threshold temperature.

APU controller 200 may include and/or be any suitable device or devices that are adapted, configured, designed, and/or programmed to perform the functions of APU controller 200 discussed herein. For example, APU controller 200 may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure.

As schematically illustrated in FIG. 4, APU 100 may include an air intake 110, a powerhead 102, and/or a load compressor stage 104. As further schematically illustrated in FIG. 4, powerhead 102 may be configured to receive an engine airflow 112 from air intake 110, while load compressor stage 104 is configured to receive a load compressor airflow 114 from air intake 110. While FIG. 4 schematically illustrates air intake 110 as being a single undivided conduit, this is not required to all examples of APU 100, and it is additionally within the scope of the present disclosure that air intake 110 may include and/or be a partitioned structure, such as to segregate engine airflow 112 and load compressor airflow 114 from one another and/or to separately receive engine airflow 112 and load compressor airflow 114.

APU 100 generally is configured such that powerhead 102 drives load compressor stage 104 to produce bleed air flow 118. Specifically, powerhead 102 is configured to generate a torque that is provided and/or transmitted to load compressor stage 104 to generate bleed air flow 118. More specifically, and as schematically illustrated in FIG. 4, load compressor stage 104 may include a load compressor 150 configured to receive the torque from powerhead 102 and to compress load compressor airflow 114 to generate bleed air flow 118.

Powerhead 102 may include and/or be any appropriate structure and/or mechanism for generating the torque to drive load compressor 150. For example, and as schematically illustrated in FIG. 4, powerhead 102 may include a powerhead compressor 140 configured to compress engine airflow 112, a combustion chamber 142 configured to mix and combust engine airflow 112 with a fuel flow 144, and/or a powerhead turbine 148 configured to generate the torque from engine airflow 112. In such examples, and as schematically illustrated in FIG. 4, combustion chamber 142 may be described as being positioned downstream of powerhead compressor 140 with respect to engine airflow 112, and/or powerhead turbine 148 may be described as being positioned downstream of combustion chamber 142 with respect to engine airflow 112. In this manner, powerhead 102 generally is configured to generate the torque to drive load compressor 150 via combustion of a compressed engine airflow 112. More specifically, combustion of a mixture of engine airflow 112 and fuel flow 144 within combustion chamber 142 energizes, reacts, and/or expands the mixture and produces combustion products that drive powerhead turbine 148 to produce the torque to drive load compressor 150.

Auxiliary power system 50 may be configured to deliver and/or regulate fuel flow 144 in any appropriate manner. For example, and as schematically illustrated in FIG. 4, auxiliary power system 50 additionally may include a fuel pump 146 configured to regulate fuel flow 144 delivered to combustion chamber 142. In such an example, APU controller 200 additionally may be adapted, configured, and/or programmed to generate and transmit a fuel pump command 212 to selectively control a flow rate of fuel flow 144 produced by fuel pump 146.

As further schematically illustrated in FIG. 4, auxiliary power system 50 and/or APU 100 additionally may include an exhaust outlet 120 configured to direct an exhaust flow 116 away from powerhead 102 and/or powerhead turbine 148 thereof. As described herein, exhaust flow 116 may include, be, and/or correspond to any appropriate flow of air, fuel, combustion products, and/or other fluid associated with powerhead 102. For example, exhaust flow 116 may include and/or be a portion and/or an entirety of engine airflow 112, of fuel flow 144, and/or of combustion products produced therefrom that flow downstream of and/or from powerhead compressor 140, combustion chamber 142, and/or powerhead turbine 148. With continued reference to FIG. 4, auxiliary power system 50 additionally may include an exhaust gas temperature (EGT) sensor 122 configured to measure an EGT of exhaust flow 116 and to generate and transmit an EGT signal 124 to APU controller 200. That is, EGT sensor 122 may be configured to measure the EGT and to generate EGT signal 124 based, at least in part, on the EGT. In this manner, a flow regulator command 210, which may be generated by APU controller 200, may be based, at least in part, on EGT signal 124. EGT sensor 122 may include and/or be any appropriate apparatus for measuring the EGT, examples of which include an EGT thermocouple (TC) and/or an EGT resistance temperature detector (RTD).

APU 100 may be configured to transmit the torque from powerhead 102 (and/or powerhead turbine 148) to load compressor stage 104 (and/or load compressor 150) in any appropriate manner. For example, and as schematically illustrated in FIG. 4, APU 100 may include a shaft 160 that extends along a central axis 106 and that is configured to transmit the torque from powerhead 102 to load compressor 150. More specifically, shaft 160 may be configured to rotate about central axis 106, which also may be referred to herein as a shaft rotational axis 106, to transmit the torque from powerhead 102 to load compressor 150. In such examples, shaft 160 may be described as interconnecting, as mechanically interconnecting, and/or as operatively interconnecting powerhead 102 and load compressor stage 104. In a specific example, powerhead turbine 148 and load compressor 150 each may be fixedly mounted to shaft 160 such that a torque exerted on shaft 160 by powerhead turbine 148 corresponds directly to a torque exerted on load compressor 150 by shaft 160.

As used herein, the torque exerted on shaft 160 by powerhead 102 and/or powerhead turbine 148 may be referred to as a positive torque. Similarly, a torque exerted on shaft 160 by load compressor stage 104 and/or load compressor 150 may be referred to as a negative torque. Stated differently, load compressor stage 104 and/or load compressor 150 may operate to at least partially restrict, oppose, and/or resist rotation of shaft 160 about central axis 106. In an example of auxiliary power system 50 that includes a generator 162, generator 162 also may be described as exerting a negative torque on shaft 160, which may at least partially restrict, oppose, and/or resist rotation of shaft 160 about central axis 106. When present, and as schematically illustrated in FIG. 4, generator 162 may be operatively coupled to shaft 160 in any appropriate manner. For example, generator 162 may be mounted on and/or operatively coupled to an accessory gearbox that is operatively coupled to shaft 160.

Powerhead turbine 148 may include and/or be any appropriate structure for converting a flow of engine airflow 112, fuel flow 144, and/or combustion products and/or exhaust flow 116 produced therefrom into the positive torque. As an example, and as schematically illustrated in FIG. 4, powerhead turbine 148 may include a plurality of powerhead turbine rotor blades 149, such as may be fixedly coupled to shaft 160 and/or may be configured to rotate and/or revolve about central axis 106 responsive to a flow of engine airflow 112, fuel flow 144, combustion products produced therefrom, and/or exhaust flow 116 therepast.

Similarly, powerhead compressor 140 may include and/or be any appropriate structure for utilizing the positive torque to compress and/or accelerate engine airflow 112, such as toward and/or into combustion chamber 142. As examples, powerhead compressor 140 may be configured as an axial compressor and/or as a centrifugal compressor. Additionally or alternatively, and as schematically illustrated in FIG. 4, powerhead compressor 140 may include a plurality of powerhead compressor rotor blades 141, such as may be fixedly and/or operatively coupled to shaft 160 and/or may be configured to rotate and/or revolve about central axis 106 to accelerate engine airflow 112 responsive to powerhead turbine 148 exerting the positive torque on shaft 160.

In a similar manner, load compressor 150 may include and/or be any appropriate structure for utilizing the positive torque to compress and/or accelerate load compressor airflow 114. As examples, load compressor 150 may be configured as an axial compressor and/or as a centrifugal compressor. Additionally or alternatively, and as schematically illustrated in FIG. 4, load compressor 150 may include a plurality of load compressor rotor blades 151, such as may be fixedly and/or operatively coupled to shaft 160 and/or may be configured to rotate and/or revolve about central axis 106 to accelerate load compressor airflow 114 responsive to powerhead turbine 148 exerting the positive torque on shaft 160.

As further schematically illustrated in FIG. 4, load compressor stage 104 additionally includes a flow regulator assembly 152 configured to regulate a flow rate of load compressor airflow 114 through load compressor 150. As described herein, flow regulator assembly 152 also may be described as being configured to regulate a pressure of bleed air flow 118, a flow rate of bleed air flow 118, and/or the bleed air temperature.

As used herein, the terms "upstream," "downstream," and the like refer generally to a region, a position, and/or a direction with respect to a general, overall, and/or average direction of fluid flow in a given region. As an example, load compressor 150 may be described as being positioned downstream of flow regulator assembly 152 with respect to load compressor airflow 114. Similarly, powerhead turbine 148 may be described as being positioned downstream of powerhead compressor 140 with respect to engine airflow 112.

As used herein, the term "flow rate" may refer and/or correspond to any appropriate physical property characterizing a fluid flow. Examples of such flow rates include a flow velocity, an average flow velocity, a volumetric flow rage, an average volumetric flow rate, a mass flow rate, and/or an average mass flow rate.

As described herein, bleed air flow 118 may include, be, and/or correspond to any appropriate flow of air produced, compressed, generated, discharged from, and/or otherwise associated with load compressor stage 104. For example, bleed air flow 118 may include and/or be a portion and/or an entirety of load compressor airflow 114 that flows downstream of, that flows away from, and/or that is discharged from load compressor 150.

As discussed herein, the bleed air temperature of bleed air flow 118 may depend upon a flow rate of load compressor airflow 114 through flow regulator assembly 152. For example, load compressor 150 may operate to compress load compressor airflow 114 such that the bleed air temperature and/or a pressure of bleed air flow 118 is greater than that of load compressor airflow 114 upstream of load compressor 150. Stated differently, load compressor 150 may be configured to compress load compressor airflow 114 such that bleed air flow 118 is pressurized relative to a portion of load compressor airflow 114 upstream of load compressor 150, thereby raising the bleed air temperature relative to the portion of load compressor airflow 114 upstream of load compressor 150. Accordingly, the bleed air temperature may be at least partially based upon a rate at which load compressor airflow 114 is compressed by load compressor 150 (e.g., such as may be related to a rotational speed of load compressor 150). Additionally or alternatively, the bleed air temperature may be at least partially based upon a flow rate of load compressor airflow 114 into load compressor 150. Accordingly, regulating the flow rate of load compressor airflow 114, such as via flow regulator assembly 152 as described herein, may permit control of the bleed air temperature even when load compressor 150 operates at a constant rotational speed.

As used herein, the term "rotational speed," as used to describe a component that rotates with respect to one or more other components of auxiliary power system 50, generally refers to an angular velocity of the component, such as with respect to an axis of rotation. In an example in which the axis of rotation does not intersect the component, the term "rotational speed" additionally or alternatively may refer to a rate of revolution of the component about the axis of rotation. In the examples provided herein, a rotational speed generally refers to a rotational speed about an axis that is parallel to, collinear with, and/or identical to central axis 106. However, this is not required to all examples disclosed herein, and it is additionally within the scope of the present disclosure that a rotational speed of one or more components of APU 100 may correspond to a rotation about an axis that is spaced apart from and/or not parallel to central axis 106.

Auxiliary power system 50 may be configured to regulate, establish, and/or maintain a rotational speed of one or more components thereof. For example, and as schematically illustrated in FIG. 4, auxiliary power system 50 may include one or more rotational speed sensors 172 configured to measure a rotational speed of one or more components of APU 100, such as a rotational speed of shaft 160, of powerhead compressor 140, of powerhead turbine 148, and/or of load compressor 150. As further schematically illustrated in FIG. 4, each rotational speed sensor 172 may be configured to generate and transmit a respective rotational speed signal 174 to APU controller 200. Each rotational speed signal 174 may include and/or correspond to a measurement of a rotational speed of one or more components of APU 100. For example, rotational speed signal 174 may include and/or correspond to a measurement of a respective rotational speed of each of one or more of powerhead compressor 140, powerhead turbine 148, and load compressor 150. As schematically illustrated in FIG. 4, rotational speed sensor 172 may be operatively coupled to shaft 160. Additionally or alternatively, rotational speed sensor 172 may be a component of APU 100, of powerhead 102, and/or of load compressor stage 104. However, this is not required to all examples of auxiliary power system 50 that include rotational speed sensor 172, and it is additionally within the scope of the present disclosure that rotational speed sensor 172 may be positioned at any appropriate location within auxiliary power system 50.

In an example of auxiliary power system 50 that includes rotational speed sensor 172, APU controller 200 may be adapted, configured, and/or programmed to generate flow regulator command 210 and/or fuel pump command 212 based, at least in part, on rotational speed signal 174. As a more specific example, APU controller 200 may be adapted, configured, and/or programmed to generate and transmit fuel pump command 212 to fuel pump 146 responsive to rotational speed signal 174 to regulate fuel flow 144 such that a rotational speed of shaft 160 remains at least substantially constant.

Auxiliary power system 50 generally is configured to regulate the bleed air temperature of bleed air flow 118 via selective control of flow regulator assembly 152. For example, auxiliary power system 50 may be configured to selectively and actively control flow regulator assembly 152, such as to maintain the bleed air temperature below a threshold bleed air temperature. More specifically, and with continued reference to FIG. 4, auxiliary power system 50 includes a BAT sensor 132 configured to measure the bleed air temperature of bleed air flow 118. BAT sensor 132 is configured to generate a BAT signal 134 that is based, at least in part, on the bleed air temperature. As further schematically illustrated in FIG. 4, APU controller 200 is adapted, configured, and/or programmed to receive BAT signal 134 from BAT sensor 132 and to generate flow regulator command 210 based, at least in part, on BAT signal 134. APU controller 200 further is adapted, configured, and/or programmed to transmit flow regulator command 210 to flow regulator assembly 152 to selectively regulate the flow rate of load compressor airflow 114 through flow regulator assembly 152, as described herein.

Auxiliary power system 50 may include and/or incorporate BAT sensor 132 in any appropriate manner. For example, APU 100 may structurally support and/or enclose BAT sensor 132. Additionally or alternatively, and as schematically illustrated in FIG. 4, auxiliary power system 50 may include a bleed air conduit 130 configured to direct bleed air flow 118 away from APU 100, and BAT sensor 132 may be positioned at least partially within bleed air conduit 130. However, this is not required to all examples of auxiliary power system 50, and it is within the scope of the present disclosure that BAT sensor 132 may be positioned at least partially, or even fully, upstream of bleed air conduit 130 with respect to bleed air flow 118. Additionally or alternatively, and as discussed in more detail herein with reference to FIG. 2, one or more BAT sensors 132 may be positioned downstream from APU 100, within bleed air conduit 130, and/or proximate bleed air consumers 60. BAT sensor 132 may include and/or be any appropriate apparatus for measuring the bleed air temperature, examples of which include a BAT thermocouple (TC) a BAT resistance temperature detector (RTD), and/or a BAT thermistor. Additional examples of BAT sensor 132 are disclosed herein with reference to FIG. 5.

Returning to FIG. 4, the bleed air temperature of bleed air flow 118 may be at least partially based upon, related to, and/or a result of a rotational speed of load compressor 150. Specifically, and as discussed, load compressor 150 may be configured to compress load compressor airflow 114. This compression may cause bleed air flow 118 to have a higher temperature relative to a portion of load compressor airflow 114 that is upstream of load compressor 150. In this manner, an increase (or decrease) in the rotational speed of load compressor 150 may correspond to an increase (or decrease) in the bleed air temperature. The rotational speed of load compressor 150 may be based upon, may correspond to, and/or may be equal to a rotational speed of shaft 160, of powerhead compressor 140, and/or of powerhead turbine 148. Accordingly, in such examples, varying a rotational speed of powerhead turbine 148 (such as by varying a rate of fuel flow 144 into combustion chamber 142) may serve to vary the rotational speed of load compressor 150, thereby varying the bleed air temperature.

However, such a mechanism for regulating the bleed air temperature may be impractical. As an example, it may be desirable to operate powerhead turbine 148 at a rotational speed that is at least substantially constant. Accordingly, auxiliary power system 50 may be described as being configured to regulate the bleed air temperature while powerhead turbine 148 operates at a rotational speed that is at least substantially constant. More specifically, and as described herein, auxiliary power system 50 may be configured to regulate the bleed air temperature at least partially via selective actuation of flow regulator assembly 152.

Figure 5:
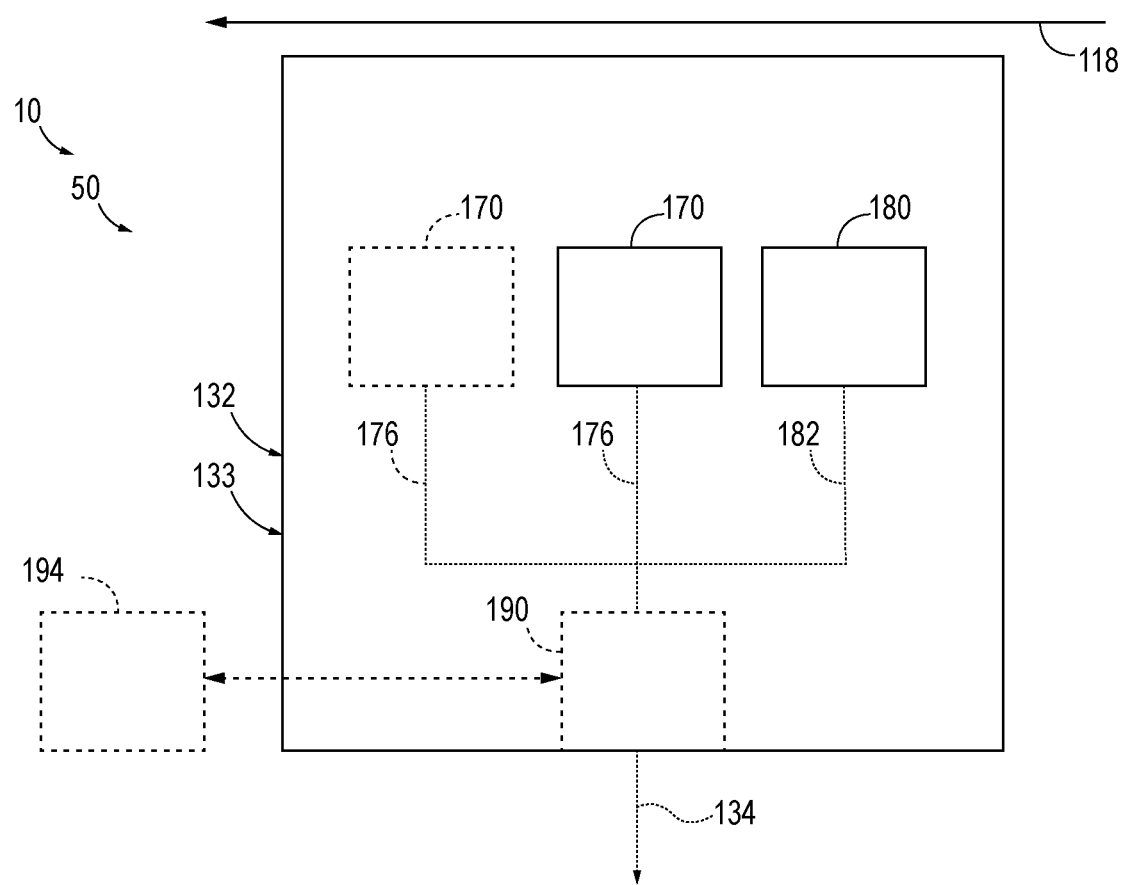
FIG. 5 is a schematic illustration of examples of a bleed air temperature sensor suite according to the present disclosure.

In some examples, and as illustrated in FIG. 5, BAT sensor 132 may include and/or be a BAT sensor suite 133. BAT sensor suite 133, when present, may include at least one BAT magnitude sensor 170 and at least one BAT thermal switch 180. BAT magnitude sensor 170 may be in thermal communication with bleed air flow 118 and may be adapted, configured, designed, and/or constructed to generate a BAT magnitude sensor signal 176 that is indicative of the bleed air temperature of bleed air flow 118. BAT thermal switch 180 also may be in thermal communication with bleed air flow 118 and may be adapted, configured, designed, and/or constructed to generate a BAT thermal switch signal 182. In such a configuration, BAT signal 134 may be based, at least in part, on BAT magnitude sensor signal 176 and/or on BAT thermal switch signal 182, as discussed in more detail herein.

BAT thermal switch signal 182 may be a binary BAT thermal switch signal. Stated differently, BAT thermal switch signal 182 may have a, or a single, low-temperature output value when the bleed air temperature is less than a threshold BAT range. In addition, BAT thermal switch signal 182 may have a, or a single, high-temperature output value when the bleed air temperature is greater than the threshold BAT range. In contrast, BAT magnitude sensor 170 may generate a plurality, or even a continuous distribution, of different BAT magnitude sensor signals 176, with each BAT magnitude sensor signal 176 corresponding to a specific bleed air temperature.

Examples of BAT magnitude sensor 170 include an analog BAT magnitude sensor, a digital BAT magnitude sensor, a continuous BAT magnitude sensor, a BAT magnitude sensing thermocouple, a BAT magnitude sensing resistance thermal detector, and/or a BAT magnitude sensing thermistor. Examples of BAT thermal switch 180 include a BAT thermal cutoff switch, a normally closed BAT thermal switch, a normally open BAT thermal switch, a bistable BAT thermal switch, a bimetallic BAT thermal switch, a mechanical BAT thermal switch, and/or a solid state thermal switch. BAT magnitude sensor 170 and BAT thermal switch 180 may utilize different operational principles. As such, BAT magnitude sensor 170 and BAT thermal switch 180 may exhibit different failure modes, thereby permitting and/or facilitating validation of BAT magnitude sensor signal 176 utilizing BAT thermal switch signal 182, as is discussed in more detail herein.

In some examples, and as illustrated in solid and dashed lines in FIG. 5, BAT sensor suite 133 may include a plurality of BAT magnitude sensors 170. In such a configuration, each BAT magnitude sensor 170 may be configured to generate a corresponding BAT magnitude sensor signal 176, which may be indicative of a corresponding BAT magnitude measurement. Also in such a configuration, BAT signal 134 may be based, at least in part, on at least one corresponding BAT magnitude sensor signal 176 of at least one BAT magnitude sensor 170. As examples, BAT signal 134 may be based, at least in part, on an average of the corresponding BAT magnitude measurement from each BAT magnitude sensor 170 of the plurality of BAT magnitude sensors 170, a mean of the corresponding BAT magnitude measurement from each BAT magnitude sensor 170 of the plurality of BAT magnitude sensors 170, a median of the corresponding BAT magnitude measurement from each BAT magnitude sensor 170 of the plurality of BAT magnitude sensors 170, a minimum corresponding BAT magnitude measurement from each BAT magnitude sensor 170 of the plurality of BAT magnitude sensors 170, a maximum corresponding BAT magnitude measurement from each BAT magnitude sensor 170 of the plurality of BAT magnitude sensors 170, and/or a linear combination of the corresponding BAT magnitude measurement from each BAT magnitude sensor 170 of the plurality of BAT magnitude sensors 170.

As illustrated in dashed lines in FIG. 5, BAT sensor suite 133 may include a BAT signal processor 190. BAT signal processor 190, when present, may be configured to process BAT magnitude sensor signal 176 and BAT thermal switch signal 182. In some examples, BAT signal processor 190 may be included within a BAT sensor suite package that also includes BAT magnitude sensor 170 and BAT thermal switch 180. In some examples, BAT signal processor 190 may be spaced-apart from, or from a location of, BAT magnitude sensor 170 and BAT thermal switch 180, such as via incorporation within APU controller 200 of FIGS. 2 and 4.

In some examples, BAT signal processor 190 may be configured to verify a validity of BAT magnitude sensor signal 176, such as via a comparison between BAT magnitude sensor signal 176 and BAT thermal switch signal 182. Stated differently, if both BAT magnitude sensor 170 and BAT thermal switch 180 are operating correctly, as designed, and/or as expected, than BAT magnitude sensor signal 176 generally will be consistent with BAT thermal switch signal 182. Alternatively, if either BAT magnitude sensor 170 or BAT thermal switch 180 is operating incorrectly, has failed, and/or is in an error state, then BAT magnitude sensor signal 176 generally will not be consistent with BAT thermal switch signal 182. With this in mind, BAT signal processor 190 may be configured to determine that BAT magnitude sensor signal 176 is valid when BAT magnitude sensor signal 176 is consistent with the BAT thermal switch signal 182. Alternatively, BAT signal processor 190 may be configured to determine that BAT magnitude sensor signal 176 is invalid when BAT magnitude sensor signal 176 is inconsistent with BAT thermal switch signal 182. More particularly, BAT signal processor 190 may be configured to determine that BAT magnitude sensor signal 176 is valid when BAT magnitude sensor signal 176 and BAT thermal switch signal 182 both indicate that the bleed air temperature is less than the threshold BAT range and/or when BAT magnitude sensor signal 176 and the BAT thermal switch signal 182 both indicate that the bleed air BAT is greater than the threshold BAT range. Alternatively, BAT signal processor 190 may be configured to determine that BAT magnitude sensor signal 176 is invalid when BAT magnitude sensor signal 176 indicates that the bleed air BAT is greater than the threshold BAT range and BAT thermal switch signal 182 indicates that the bleed air BAT is less than the threshold BAT range. BAT signal processor 190 also may be configured to determine that BAT magnitude sensor signal 176 is invalid when BAT magnitude sensor signal 176 indicates that the bleed air BAT is less than the threshold BAT range and BAT thermal switch signal 182 indicates that the bleed air BAT is greater than the threshold BAT range.

In some examples, and upon determining that BAT magnitude sensor signal 176 is invalid, BAT signal processor 190 may be configured to generate a failure notification 192, which may be indicative of failure of BAT sensor suite 133. Generation of failure notification 192 may cause an indicator 194 to indicate that BAT sensor suite 133 has failed, such as to a user of auxiliary power system 50. Examples of indicator 194 include an indicator light, an indicator alarm, and/or an indicator display.

Flow regulator assembly 152 may include and/or be any appropriate structure for regulating a flow rate of load compressor airflow 114. For example, and as schematically illustrated in FIG. 4, flow regulator assembly 152 may include a plurality of inlet guide vanes 154 and an inlet guide vane actuator 156. Inlet guide vane actuator 156 may be configured to actuate the plurality of inlet guide vanes 154 to regulate load compressor airflow 114 through flow regulator assembly 152. This regulation may be at least partially responsive to flow regulator command 210 that is provided to flow regulator assembly 152 by APU controller 200. In such an example, flow regulator assembly 152 also may be referred to as an inlet guide vane assembly 152.

Figure 6:
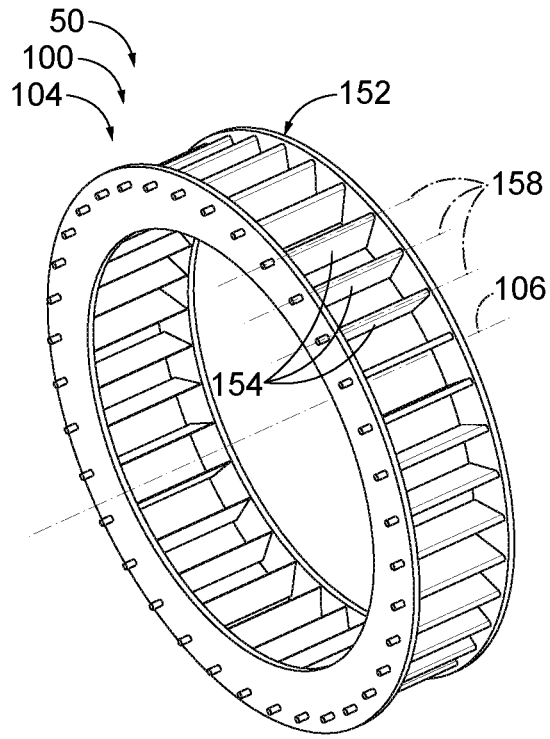
FIG. 6 is a side elevation view illustrating an example of an inlet guide vane assembly in a fully open configuration according to the present disclosure.
Figure 7:
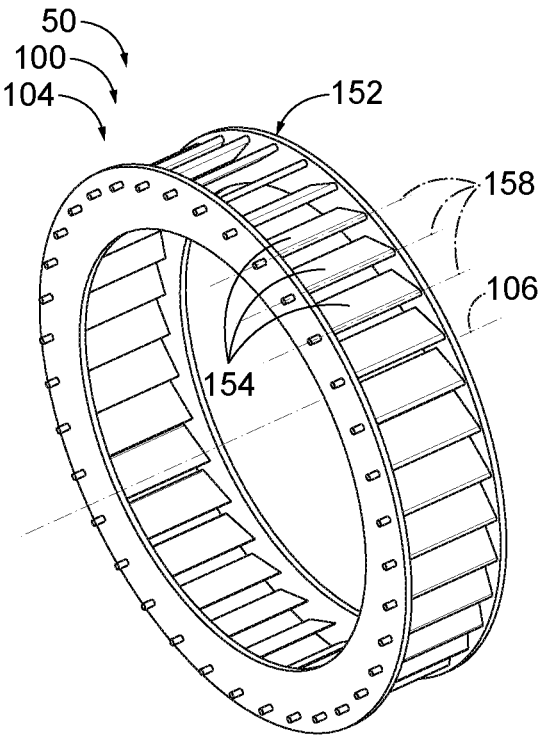
FIG. 7 is a side elevation view illustrating the inlet guide vane assembly of FIG. 6 in an intermediate configuration according to the present disclosure.
Figure 8:
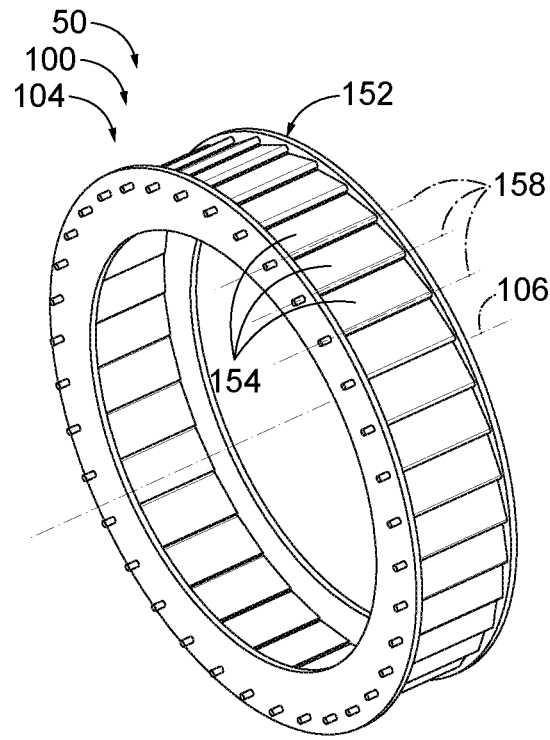
FIG. 8 is a side elevation view illustrating the inlet guide vane assembly of FIGS. 6-7 in a fully closed configuration according to the present disclosure.

FIGS. 6-8 illustrate an example of flow regulator assembly 152 that includes the plurality of inlet guide vanes 154. As illustrated in FIGS. 6-8, each inlet guide vane 154 may be configured to pivot about a respective vane pivot axis 158, such as responsive to actuation by inlet guide vane actuator 156 (not illustrated in FIGS. 6-8), to selectively regulate load compressor airflow 114 through flow regulator assembly 152. More specifically, each inlet guide vane 154 may be configured to be selectively transitioned between a fully open configuration (illustrated in FIG. 6) and a fully closed configuration (illustrated in FIG. 8) via a plurality (such as a continuous plurality and/or a continuum) of intermediate configurations (an example of which is illustrated in FIG. 7). In this manner, load compressor airflow 114 is at least substantially unimpeded by flow regulator assembly 152 when each inlet guide vane 154 is in the fully open configuration, and load compressor airflow 114 is at least substantially blocked by flow regulator assembly 152 when each inlet guide vane 154 is in the fully closed configuration. Accordingly, actuation of the plurality of inlet guide vanes 154 to a selected pivotal configuration may permit continuous variation of load compressor airflow 114 between a maximum flow rate (corresponding to the fully open configuration of inlet guide vanes 154) and a minimum flow rate (corresponding to the fully closed configuration of inlet guide vanes 154).

FIGS. 6-8 illustrate an example of flow regulator assembly 152 in which the plurality of inlet guide vanes 154 generally operate to selectively restrict the flow rate of load compressor airflow 114 traveling from an exterior of flow regulator assembly 152 radially inward through inlet guide vanes 154 to an interior of flow regulator assembly 152. Accordingly, in the example of FIGS. 6-8, the plurality of inlet guide vanes 154 is arranged such that each vane pivot axis 158 is at least substantially parallel to central axis 106 of APU 100. However, this is not required to all examples of flow regulator assembly 152, and it is additionally within the scope of the present disclosure that each vane pivot axis 158 may be at least substantially perpendicular to central axis 106 and/or may have any other appropriate orientation relative to central axis 106.

Returning to FIG. 4, APU controller 200 may be adapted, configured, and/or programmed to regulate the bleed air temperature via any appropriate routine and/or responsive to any appropriate inputs. For example, flow regulator command 210 may be based, at least in part, on a system demand associated with one or more systems 20 of aircraft 10, such as to maintain an appropriate pressure and/or supply of bleed air flow 118. Additionally or alternatively, and as described herein, flow regulator command 210 may be based, at least in part, on one or both of BAT signal 134 and EGT signal 124, such as to ensure that the bleed air temperature remains within a desired and/or predetermined temperature range. In this manner, auxiliary power system 50 generally is configured to regulate the bleed air temperature of bleed air flow 118 independent of the rotational speed of powerhead compressor 140, of powerhead turbine 148, of load compressor 150, and/or of shaft 160.

As further described herein, APU controller 200 may be adapted, configured, and/or programmed to generate and transmit fuel pump command 212 to regulate the flow rate of fuel flow 144 via fuel pump 146, such as to regulate a rotational speed of one or more components of APU 100. As examples, and as discussed herein, fuel pump command 212 may be based, at least in part, upon rotational speed signal 174 associated with one or more of powerhead compressor 140, powerhead turbine 148, load compressor 150, and/or shaft 160, such as to maintain a substantially constant rotational speed of such component(s) during operation of APU 100. However, and as discussed, the bleed air temperature also may be at least partially based upon a rotational speed of load compressor 150, which in turn may be at least partially based upon the flow rate of fuel flow 144. Accordingly, APU controller 200 additionally or alternatively may be adapted, configured, and/or programmed to generate fuel pump command 212 based, at least in part, on BAT signal 134 and/or EGT signal 124. Stated differently, it is within the scope of the present disclosure that APU controller 200 may be adapted, configured, and/or programmed to regulate the bleed air temperature and/or the EGT via selective regulation of fuel flow 144, such as by generating fuel pump command 212 at least partially responsive to a measurement of the bleed air temperature and/or of the EGT.

APU controller 200 may be adapted, configured, and/or programmed to generate flow regulator command 210 in any appropriate manner. For example, APU controller 200 may be adapted, configured, and/or programmed to generate one or more flow regulator command components such that flow regulator command 210 is based, at least in part, on each flow regulator command component. As examples, APU controller 200 may be adapted, configured, and/or programmed to generate a flow regulator command component associated with a difference between the bleed air temperature and the threshold BAT range, a difference between the EGT and a threshold EGT, and/or a system demand associated with one or more systems 20 of aircraft 10. As more specific examples, APU controller 200 may be adapted, configured, and/or programmed to generate each flow regulator command component via a respective proportional-integral-derivative (PID) algorithm, such as may be known to the art of systems control. In such examples, each flow regulator command component may be generated via a respective PID algorithm that utilizes a respective proportional (P) gain value, a respective integral (I) gain value, and/or a respective derivative (D) gain value. The respective P gain value, the respective I gain value, and/or the respective D gain value may be determined in any appropriate manner. For example, the respective P gain value, the respective I gain value, and/or the respective D gain value may be predetermined, such as prior to utilization of auxiliary power system 50. Additionally or alternatively, APU controller 200 maybe adapted, configured, and/or programmed to dynamically update the respective P gain value, the respective I gain value, and/or the respective D gain value during utilization of auxiliary power system 50.

Figure 9:
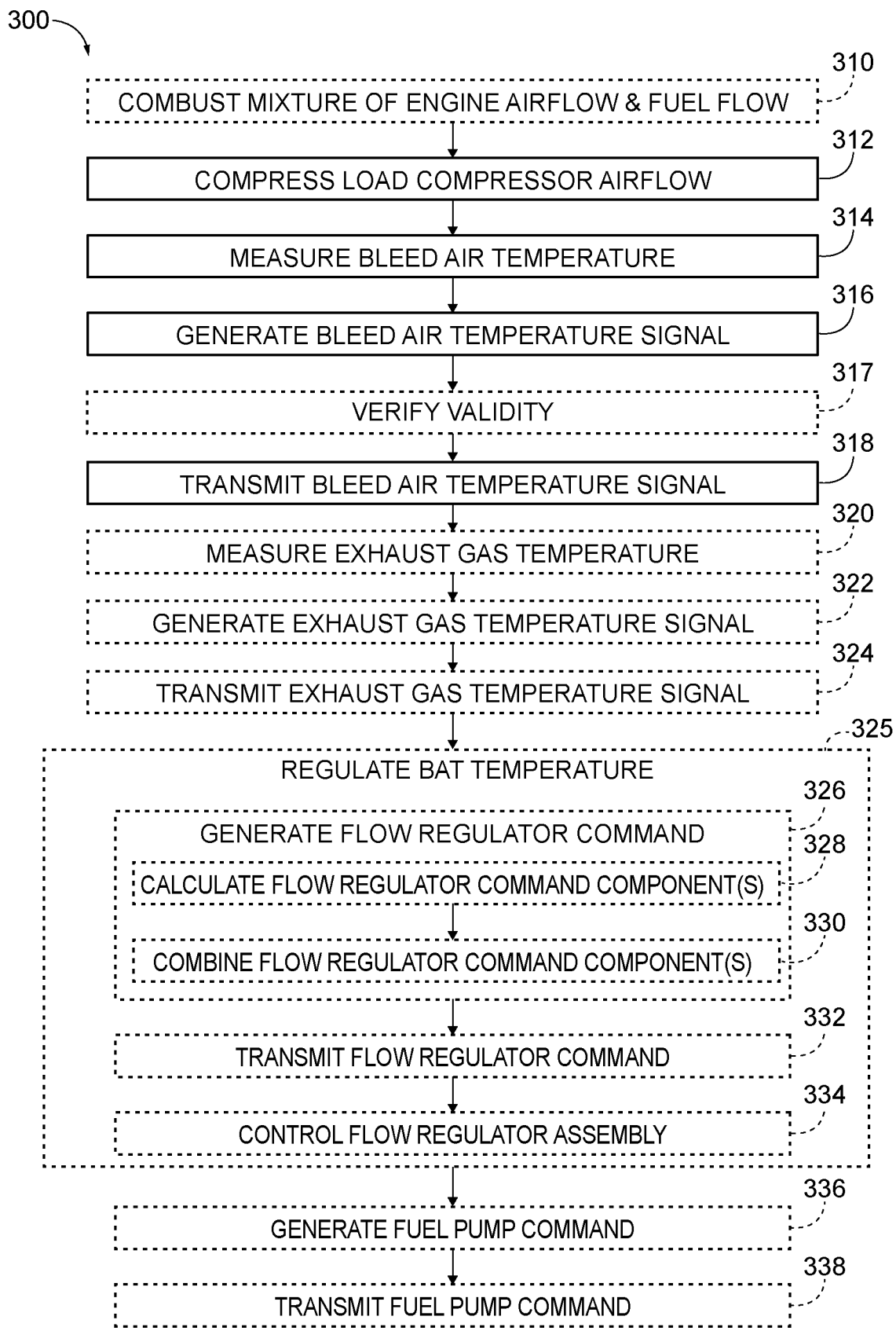
FIG. 9 is a flowchart schematically representing methods of utilizing an auxiliary power system to regulate a bleed air temperature of a bleed air flow generated by an auxiliary power unit according to the present disclosure.

FIG. 9 is a flowchart depicting methods 300, according to the present disclosure, of utilizing an auxiliary power system (such as auxiliary power system 50) to regulate a bleed air temperature of a bleed air flow (such as bleed air flow 118) generated by an APU (such as APU 100). In FIG. 9, some steps are illustrated in dashed boxes indicating that such steps may be optional or may correspond to an optional version of the method according to the present disclosure. That said, not all methods according to the present disclosure are required to include the steps illustrated in solid boxes. The methods and steps illustrated in FIG. 9 are not limiting and other methods and steps are within the scope of the present disclosure, including methods having greater than or fewer than the number of steps illustrated, as understood from the discussions herein.

As illustrated in FIG. 9, methods 300 may include combusting, at 310, a mixture of an engine airflow (such as engine airflow 112) and a fuel flow (such as fuel flow 144). As also illustrated in FIG. 9, methods 300 include compressing, at 312, a load compressor airflow (such as load compressor airflow 114) to generate the bleed air flow; measuring, at 314, the bleed air temperature with a BAT sensor (such as BAT sensor 132); and generating, at 316, a BAT signal (such as BAT signal 134). The generating the BAT signal at 316 is based, at least in part, on the bleed air temperature as determined in the measuring the bleed air temperature at 314. Methods 300 also may include verifying a validity, at 317, and transmitting, at 318, the BAT signal to an APU controller (such as APU controller 200). Methods 300 further may include measuring an exhaust gas temperature (EGT) at 320, generating an exhaust gas temperature (EGT) signal (such as EGT signal 124) at 322, and/or transmitting the EGT signal at 324. Methods 300 also may include regulating a bleed air temperature at 325, generating a fuel pump command (such as fuel pump command 212) at 336, and/or transmitting the fuel pump command at 338.

The regulating at 325 may include generating, at 326, a flow regulator command (such as flow regulator command 210), transmitting, at 332, the flow regulator command to a flow regulator assembly (such as flow regulator assembly 152), and/or controlling the flow regulator assembly. The generating the flow regulator command at 326 may include generating such that the flow regulator command is based, at least in part, on the BAT signal. As further illustrated in FIG. 9, the regulating at 325 also may include controlling, at 334, the flow regulator assembly to regulate a flow rate of the load compressor airflow. The controlling at 334 may be based, at least in part, on the flow regulator command.

In this manner, methods 300 may include regulating the bleed air temperature of the bleed air flow via selective control of the flow regulator assembly responsive to and concurrent with a measurement of the bleed air temperature. The controlling at 334 may be performed in any appropriate manner. For example, the flow regulator assembly may include a plurality of inlet guide vanes (such as inlet guide vanes 154) and an inlet guide vane actuator (such as inlet guide vane actuator 156), and the controlling at 334 may include selectively actuating the plurality of inlet guide vanes with the inlet guide vane actuator responsive to the flow regulator command.

In some examples, the generating the flow regulator command at 326 additionally may be at least partially based upon a measured temperature of an exhaust produced by the APU. For example, the combusting at 310 may include combusting to generate an exhaust flow (such as exhaust flow 116), and the measuring at 320 may include measuring the EGT of the exhaust flow with an EGT sensor (such as EGT sensor 122). In such examples, methods 300 further may include the generating at 322 of the EGT signal with the EGT sensor. The generating at 322 may be based, at least in part, on the EGT, and the transmitting at 324 may include transmitting the EGT signal to the APU controller. In such an example, the generating the flow regulator command at 326 may be based, at least in part, on the EGT signal.

The generating the flow regulator command at 326 may be performed in any appropriate manner and/or via any appropriate routine. For example, and as shown in FIG. 9, the generating the flow regulator command at 326 may include calculating, at 328, each of one or more flow regulator command components and combining, at 330, each flow regulator command component to produce the flow regulator command. As examples, the calculating each flow regulator command component at 328 may include calculating a flow regulator command component associated with a difference between the bleed air temperature and a threshold bleed air temperature, a difference between the EGT and a threshold EGT, and/or a system demand associated with one or more systems of an aircraft (such as systems 20 of aircraft 10).

The calculating each flow regulator command component at 328 may include calculating via any appropriate method and/or algorithm, such as may be known to the art of systems control. As examples, the calculating each flow regulator command component at 328 may include employing one or more of a respective proportional-integral-derivative (PID) algorithm, a respective multivariable control algorithm, and a respective minimum-variance control algorithm. As a more specific example, each flow regulator command component may be generated via a respective PID algorithm that utilizes a respective proportional (P) gain value, a respective integral (I) gain value, and/or a respective derivative (D) gain value. In such an example, the respective P gain value, the respective I gain value, and/or the respective D gain value may be determined in any appropriate manner. For example, the respective P gain value, the respective I gain value, and/or the respective D gain value may be predetermined, such as prior to execution of one or more steps of methods 300.

Additionally or alternatively, the calculating each flow regulator command component at 328 may include dynamically updating the respective P gain value, the respective I gain value, and/or the respective D gain value concurrent with execution of one or more steps of methods 300. The combining each flow regulator command component at 330 also may be performed in any appropriate manner. For example, the calculating each flow regulator command component at 328 may include calculating such that each flow regulator command component includes and/or is a numerical quantity, and the combining at 330 may include calculating an arithmetic sum of the numerical quantities associated with each flow regulator command component.

As another example, during nominal and/or standard operation of the APU and/or the aircraft, the flow regulator command component associated with one or more systems of the aircraft may substantially exceed flow regulator command components associated with the bleed air temperature and/or the EGT. In some such examples, the combining at 330 may include combining such that the resultant flow regulator command is equal, or at least substantially equal, to and/or based on the flow regulator command component associated with one or more systems of the aircraft. Alternatively, and in some examples, the flow regulator command components associated with the bleed air temperature and/or the EGT may be comparable to the flow regulator command component associated with one or more systems of the aircraft. In some such examples, the combining at 330 may include combining in such a manner that the flow regulator command components associated with the bleed air temperature and/or the EGT may be described as at least partially offsetting and/or overriding the flow regulator command component associated with one or more systems of the aircraft.

In some examples of methods 300, such as examples that include the combusting the mixture of the engine airflow and the fuel flow at 310, methods 300 additionally may include one or more steps directed to regulating a flow rate of the fuel flow, such as the generating at 336 and/or the transmitting at 338. The generating at 336 may include generating the fuel pump command with the APU controller, and the transmitting at 338 may include transmitting the fuel pump command to a fuel pump (such as fuel pump 146) to regulate the flow rate of the fuel flow. In such examples, the combusting the mixture of the engine airflow and the fuel flow at 310 may be based, at least in part, on the transmitting at 338.

For example, the combusting at 310 may include combusting a mixture in which a ratio (such as a mass ratio) of fuel and air is based, at least in part, on the fuel pump command transmitted during the transmitting at 338. The generating the fuel pump command at 336 may be based upon any appropriate consideration and/or input. For example, the generating at 336 may include generating the fuel pump command to maintain a substantially constant rotational speed of one or more components of the APU. In such an example, the generating at 336 may include generating the fuel pump command based, at least in part, on one or more rotational speed signals (such as rotational speed signals 174). Such rotational speed signals may respectively corresponding to rotational speeds of a powerhead compressor (such as powerhead compressor 140), of a powerhead turbine (such as powerhead turbine 148), of a load compressor (such as load compressor 150), and/or of a shaft (such as shaft 160).

The measuring at 314 may include measuring the bleed air temperature in any suitable manner and/or utilizing any suitable structure. As an example, and as discussed, the measuring at 314 may include measuring the bleed air temperature with, via, and/or utilizing any suitable BAT sensor 132, examples of which are disclosed herein.

In some examples, and as discussed in more detail herein with reference to FIG. 4, the BAT sensor may include and/or be a BAT sensor suite, such as BAT sensor suite 133. BAT sensor suite 133, when present, may include a BAT magnitude sensor (such as BAT magnitude sensor 170) and a BAT thermal switch (such as BAT thermal switch 180). In such examples, the measuring at 314 may include exposing the BAT magnitude sensor to the bleed air flow and generating a BAT magnitude sensor signal (such as BAT magnitude sensor signal 176), that is indicative of the bleed air temperature. Also in such examples, the measuring at 314 may include exposing the BAT thermal switch to the bleed air flow and generating a BAT thermal switch signal (such as BAT thermal switch signal 182). The BAT thermal switch signal may define a low-temperature output value when the bleed air temperature is less than a threshold BAT range. In addition, the BAT thermal switch signal may define a high-temperature output value, which differs from the low-temperature output value, when the bleed air temperature is greater than the threshold BAT range. In such examples, and as discussed in more detail herein, the BAT signal may be based, at least in part, on the BAT magnitude sensor signal and/or on the BAT thermal switch signal.

In some examples, the BAT sensor suite may include a plurality of BAT magnitude sensors. In some such examples, each BAT magnitude sensor of the plurality of BAT magnitude sensors may be configured to generate a corresponding BAT magnitude sensor signal, which may be indicative of a corresponding BAT magnitude measurement of each BAT magnitude sensor. In some such examples, the generating at 116 may include generating the BAT signal based, at least in part, on at least one corresponding BAT magnitude sensor signal of at least one BAT magnitude sensor of the plurality of BAT magnitude sensors. As examples, the BAT signal bay be based, at least in part, on an average of the corresponding BAT magnitude measurement from each BAT magnitude sensor of the plurality of BAT magnitude sensors, a mean of the corresponding BAT magnitude measurement from each BAT magnitude sensor of the plurality of BAT magnitude sensors, a median of the corresponding BAT magnitude measurement from each BAT magnitude sensor of the plurality of BAT magnitude sensors, a minimum corresponding BAT magnitude measurement from each BAT magnitude sensor of the plurality of BAT magnitude sensors, a maximum corresponding BAT magnitude measurement from each BAT magnitude sensor of the plurality of BAT magnitude sensors, and/or a linear combination of the corresponding BAT magnitude measurement from each BAT magnitude sensor of the plurality of BAT magnitude sensors.

In some examples, and as discussed in more detail herein with reference to FIG. 2, the APU may define a bleed air outlet (such as bleed air outlet 128), and the auxiliary power system may be included within an aircraft that also includes a bleed air consumer (such as bleed air consumer 60). The bleed air consumer may be configured to receive at least a subset of the bleed air flow from the APU, and the aircraft also may include a bleed air conduit (such as bleed air conduit 130) that is configured to convey the bleed air flow from the bleed air outlet to the bleed air consumer. In some such examples, the BAT sensor may be positioned at a remote BAT location (such as remote BAT location 132c) that is outside and/or spaced-apart from the APU and/or the bleed air outlet of the APU. In some such examples, the regulating at 325 may include regulating an outlet bleed air temperature of the bleed air flow, at the bleed air outlet, based, at least in part, on the bleed air temperature of the bleed air flow at the remote BAT location. In some such examples, the regulating at 325 may include regulating a consumer bleed air temperature of the bleed air flow, at the bleed air consumer, based, at least in part, on the bleed air temperature of the bleed air flow at the remote BAT location. In some examples, the regulating at 325 may include regulating a remote bleed air temperature of the bleed air flow, at the remote BAT location, based, at least in part, on the bleed air temperature of the bleed air flow at the remote BAT location. In some such examples, the regulating at 325 may include regulating the bleed air temperature of the bleed air flow at another location and based, at least in part, on the bleed air temperature of the bleed air flow at the remote BAT location.

In some such examples, the regulating at 325 may include selectively regulating the bleed air temperature at a first selected location and subsequently regulating the bleed air temperature at second selected location that differs from the first selected location. In some such examples, the regulating at 325 may include selectively regulating the flow rate of the bleed air flow, such as via limiting and/or decreasing the bleed air flow when the bleed air temperature exceeds a threshold measured bleed air temperature.

In some examples, and as also illustrated in FIG. 2, the aircraft may include a plurality of spaced-apart BAT sensors, such as the plurality of BAT sensors 132 illustrated in FIG. 2. In some such examples, the regulating at 325 may include regulating the bleed air temperature of the bleed air flow at any suitable location and/or based upon any suitable BAT signal from any suitable BAT sensor of the plurality of spaced-apart BAT sensors. As an example, the regulating at 325 may include regulating the bleed air flow based, at least in part, on a given BAT signal of a given BAT sensor of the plurality of spaced-apart BAT sensors. As another example, the regulating at 325 may include regulating the bleed air flow based, at least in part, on a plurality of BAT signals generated by at least a subset, or even all, of the plurality of spaced-apart BAT sensors.

As discussed, and in some examples, methods 300 may include verifying a validity at 317. The verifying at 317 may include verifying a validity of the BAT signal and may be performed in any suitable manner.

As an example, and when the BAT sensor includes and/or is the BAT sensor suite, the verifying at 317 may include verifying the BAT signal via a comparison between the BAT magnitude sensor signal and the BAT thermal switch signal. Stated differently, failure of either the BAT magnitude sensor or the BAT thermal switch may cause the BAT magnitude sensor signal and the BAT thermal switch signal to be inconsistent with one another. As such, the verifying at 317 may include verifying that the BAT thermal magnitude sensor signal and the BAT thermal switch signal are consistent with one another. As more specific examples, the verifying at 317 may include determining that the BAT signal is valid when the BAT magnitude sensor signal is consistent with the BAT thermal switch signal or determining that the BAT signal is invalid when the BAT magnitude sensor signal is inconsistent with the BAT thermal switch signal. As additional more specific examples, the verifying at 317 may include determining that the BAT signal is valid when the BAT magnitude sensor signal and the BAT thermal switch signal both indicate that the bleed air temperature is less than the threshold BAT range and/or determining that the BAT signal is valid when the BAT magnitude sensor signal and the BAT thermal switch signal both indicate that the bleed air temperature is greater than the threshold BAT range. As further examples, the verifying at 317 may include determining that the BAT signal is invalid when the BAT magnitude sensor signal indicates that the bleed air temperature is greater than the threshold BAT range and the BAT thermal switch signal indicates that the bleed air temperature is less than the threshold BAT range and/or determining that the BAT signal is invalid when the BAT magnitude sensor signal indicates that the bleed air temperature is less than the threshold BAT range and the BAT thermal switch signal indicates that the bleed air temperature is greater than the threshold BAT range.

In some such examples, and responsive to determining that the BAT signal is invalid, methods 300 further may include generating a failure notification that is indicative of the BAT sensor suite. This may include supplying the failure notification to an indicator, which, upon receipt of the failure notification, may be configured to notify a user and/or operator that the BAT signal is invalid.

As another example, and when the aircraft includes the plurality of spaced-apart BAT sensors, the verifying at 317 may include verifying a validity of a first BAT signal from a first BAT sensor of the plurality of BAT sensors. This verification may be based, at least in part, on a comparison of the first BAT signal to a second BAT signal from a second BAT sensor of the plurality of BAT sensors. As an example, the verifying at 317 may include determining that the first BAT signal is valid when the first BAT signal is consistent with the second BAT signal and determining that the first BAT signal has questionable validity when the first BAT signal is inconsistent with the second BAT signal.

As a more specific example, the verifying at 317 may include determining that the first BAT signal is valid when the first BAT signal corresponds to a first bleed air temperature that is within a threshold temperature differential of a first calculated bleed air temperature that is calculated based, at least in part, on the second BAT signal. Alternatively, the determining at 317 may include determining that the first BAT signal has questionable validity when the first bleed air temperature differs from the first calculated bleed air temperature by more than the threshold temperature differential.

Examples of the threshold temperature differential include temperature differentials of 1° C., 2° C., 3° C., 4° C., 5° C., 6° C., 8° C., or 10° C.

When the verifying at 317 includes determining that the first BAT signal has questionable validity, the verifying at 317 further may include verifying a validity of both the first BAT signal and the second BAT signal. This verification may be based, at least in part, upon a comparison of the first BAT signal and the second BAT signal to a third BAT signal from a third BAT sensor of the plurality of BAT sensors. Stated differently, the verifying at 317 may include determining that the first BAT signal is valid when the first BAT signal is consistent with the third BAT signal, determining that the second BAT signal is valid when the second BAT signal is consistent with the third BAT signal, determining that the first BAT signal is invalid when the first BAT signal is inconsistent with the third BAT signal, and/or determining that the second BAT signal is invalid when the second BAT signal is inconsistent with the third BAT signal.

Consistency among the first BAT signal, the second BAT signal, and/or the third BAT signal may be verified via comparisons of measured and estimated, or calculated, bleed air temperature at various locations within the aircraft. These comparisons may be facilitated by calculation of the bleed air temperature at the various locations within the aircraft, such as may be accomplished utilizing equations 1-6 and the associated discussions.

Stated differently, methods 300 may include calculating a calculated bleed air temperature of the bleed air flow at a calculation location. The calculated bleed air temperature may be based, at least in part, on the BAT magnitude sensor signal. In some such examples, methods 300 further may include regulating a calculation location bleed air temperature of the bleed air flow at the calculation location. This regulation may be based, at least in part, on the calculated bleed air temperature of the bleed air flow at the calculation location. As discussed in more detail herein, the calculating may include calculating the calculated bleed air temperature based, at least in part, on a distance between a BAT sensor location, of the BAT sensor, and the calculation location as measured along a length of the bleed air conduit that interconnects a BAT sensor location and the calculation location, an ambient temperature, a bleed air flow rate of the bleed air flow, and/or a direction of bleed air flow between the BAT sensor location and the calculation location.

Regulating the bleed air temperature at 325 may include regulating the bleed air temperature in any suitable manner, including those that are discussed in more detail herein with reference to the generating at 326, the calculating at 328, the combining at 330, the transmitting at 332, and/or the controlling at 334.

Figure 10:
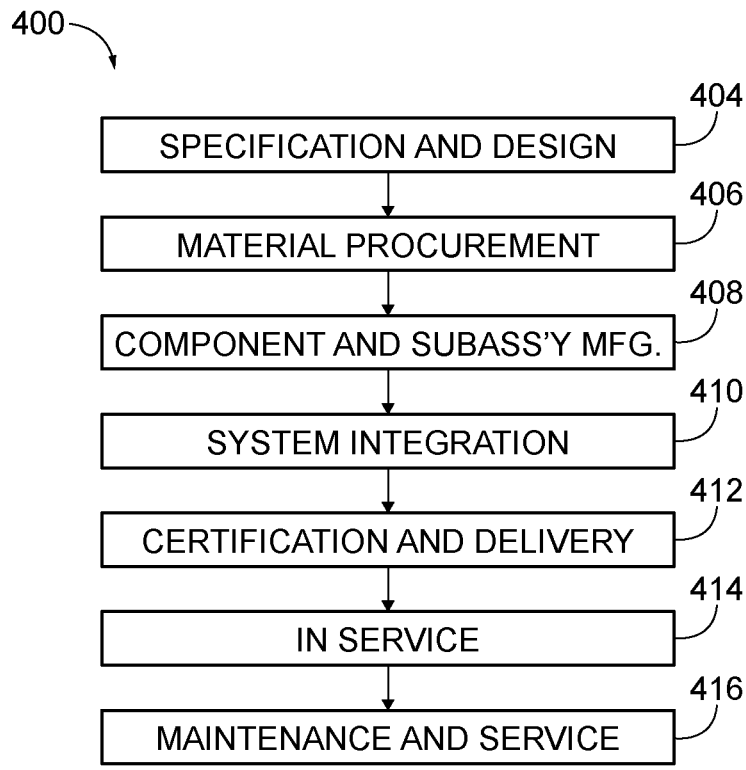
FIG. 10 is a flow diagram of aircraft production and service methodology.

Referring now to FIGS. 10-11, embodiments of the disclosure may be described in the context of an aircraft manufacturing and service method 400 as shown in FIG. 10 and an aircraft 10 as shown in FIG. 11. During pre-production, exemplary method 400 may include specification and design 404 of the aircraft 10 and material procurement 406. During production, component and subassembly manufacturing 408 and system integration 410 of the aircraft 10 takes place. Thereafter, the aircraft 10 may go through certification and delivery 412 in order to be placed in service 414. While in service by a customer, the aircraft 10 is scheduled for routine maintenance and service 416 (which may also include modification, reconfiguration, refurbishment, and so on).

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, and as discussed, the aircraft 10 produced by exemplary method 400 may include airframe 18 with a plurality of systems 20 and interior 22. Examples of high-level systems 20 include one or more of propulsion system 24, electrical system 26, hydraulic system 28, and environmental system 30. Any number of other systems may be included. Although an aerospace example is shown, the principles of the invention may be applied to other industries, such as the automotive industry.

Apparatuses and methods embodied herein may be employed during any one or more of the stages of the manufacturing and service method 400. For example, components or subassemblies corresponding to production process 408 may be fabricated or manufactured in a manner similar to components or subassemblies produced while the aircraft 10 is in service. Also, one or more apparatus embodiments, method embodiments, or a combination thereof may be utilized during the production stages 408 and 410, for example, by substantially expediting assembly of or reducing the cost of an aircraft 10. Similarly, one or more of apparatus embodiments, method embodiments, or a combination thereof may be utilized while the aircraft 10 is in service, for example and without limitation, to maintenance and service 416.

Illustrative, non-exclusive examples of inventive subject matter according to the present disclosure are described in the following enumerated paragraphs:

A1. An auxiliary power system (50) configured to regulate a bleed air temperature (BAT) of a bleed air flow (118), comprising:
an auxiliary power unit (APU) (100) configured to generate the bleed air flow (118);
an APU controller (200) configured to receive and transmit signals; and
a BAT sensor (132) configured to measure the BAT of the bleed air flow (118) and configured to generate a BAT signal (134), wherein the BAT signal (134) is based, at least in part, on the BAT;
optionally wherein the APU (100) includes at least one of:
an air intake (110);
a powerhead (102) configured to receive an engine airflow (112) from the air intake (110) and to generate a torque; and
a load compressor stage (104) configured to receive a load compressor airflow (114) from the air intake (110);
optionally wherein the load compressor stage (104) includes at least one of:
a flow regulator assembly (152) configured to regulate a flow rate of the load compressor airflow (114) through a load compressor (150); and
the load compressor (150) configured to compress the load compressor airflow (114) to generate the bleed air flow (118);
optionally wherein the load compressor (150) is driven, at least in part, by the torque generated by the powerhead (102);
optionally wherein the APU controller (200) is configured to receive the BAT signal (134) from the BAT sensor (132);

optionally wherein the APU controller (200) is configured to generate and transmit a flow regulator command (210) to the flow regulator assembly (152) to selectively regulate the flow rate of the load compressor airflow (114) through the flow regulator assembly (152); and optionally wherein the flow regulator command (210) is based, at least in part, on the BAT signal (134).

A2. The auxiliary power system (50) of paragraph A1, wherein the auxiliary power system (50) is configured to selectively and actively control the flow regulator assembly (152) to maintain the BAT below a threshold BAT.

A3. The auxiliary power system (50) of any of paragraphs A1-A2, wherein the flow regulator assembly (152) is configured to regulate one or more of a pressure of the bleed air flow (118), a flow rate of the bleed air flow (118), and the BAT.

A4. The auxiliary power system (50) of any of paragraphs A1-A3, wherein the bleed air flow (118) includes, and optionally is, a portion, and optionally an entirety, of the load compressor airflow (114) downstream of the load compressor (150).

A5. The auxiliary power system (50) of any of paragraphs A1-A4, wherein the APU (100) further includes a shaft (160) that extends along a central axis (106) and that is configured to transmit the torque from the powerhead (102) to the load compressor (150).

A6. The auxiliary power system (50) of any of paragraphs A1-A5, wherein the powerhead (102) includes:

a powerhead compressor (140) configured to compress the engine airflow (112);

a combustion chamber (142) positioned downstream of the powerhead compressor (140) with respect to the engine airflow (112) and configured to mix and combust the engine airflow (112) with a fuel flow (144); and a powerhead turbine (148) positioned downstream of the combustion chamber (142) with respect to the engine airflow (112) and configured to generate the torque from the engine airflow (112).

A7. The auxiliary power system (50) of paragraph A6 when dependent from paragraph A5, wherein the powerhead turbine (148) and the load compressor (150) each are fixedly mounted on the shaft (160).

A8. The auxiliary power system (50) of any of paragraphs A6-A7, wherein the powerhead turbine (148) is configured to operate at a powerhead turbine rotational speed, and wherein the auxiliary power system (50) is configured to regulate the BAT while the powerhead turbine rotational speed remains at least substantially constant.

A9. The auxiliary power system (50) of any of paragraphs A6-A8 when dependent from paragraph A5, wherein the powerhead turbine (148) includes a plurality of powerhead turbine rotor blades (149) fixedly coupled to the shaft (160), wherein the plurality of powerhead turbine rotor blades (149) are configured to rotate about the central axis (106) responsive to a flow of the load compressor airflow (114).

A10. The auxiliary power system (50) of any of paragraphs A6-A9 when dependent from paragraph A5, wherein the powerhead compressor (140) includes a plurality of powerhead compressor rotor blades (141) fixedly coupled to the shaft (160), wherein the plurality of powerhead compressor rotor blades (141) are configured to rotate about the central axis (106) to accelerate the engine airflow (112) responsive to the powerhead turbine (148) exerting the torque on the shaft (160).

A11. The auxiliary power system (50) of any of paragraphs A6-A10 when dependent from paragraph A5, wherein the load compressor (150) includes a plurality of load compressor rotor blades (151) fixedly coupled to the shaft (160), wherein the plurality of load compressor rotor blades (151) are configured to rotate about the central axis (106) to accelerate the load compressor airflow (114) responsive to the powerhead turbine (148) exerting the torque on the shaft (160).

A12. The auxiliary power system (50) of any of paragraphs A1-A11, wherein the APU (100) structurally supports the BAT sensor (132).

A13. The auxiliary power system (50) of any of paragraphs A1-A12, further comprising a bleed air conduit (130) configured to direct the bleed air flow (118) away from the APU (100).

A14. The auxiliary power system (50) of paragraph A13, wherein the BAT sensor (132) is positioned at least partially within the bleed air conduit (130).

A15. The auxiliary power system (50) of any of paragraphs A13-A14, wherein the BAT sensor (132) is positioned at least partially, and optionally fully, upstream of the bleed air conduit (130) with respect to the bleed air flow (118).

A16. The auxiliary power system (50) of any of paragraphs A1-A15, wherein the BAT sensor (132) includes, and optionally is, one or more of a BAT thermocouple, a BAT resistance temperature detector and a BAT thermistor.

A17. The auxiliary power system (50) of any of paragraphs A1-A16, wherein the flow regulator assembly (152) includes a plurality of inlet guide vanes (154) and an inlet guide vane actuator (156), wherein the inlet guide vane actuator (156) is configured to selectively actuate the plurality of inlet guide vanes (154) to regulate the load compressor airflow (114) through the flow regulator assembly (152) responsive to the flow regulator command (210).

A18. The auxiliary power system (50) of paragraph A17, wherein each inlet guide vane (154) of the plurality of inlet guide vanes (154) is configured to pivot about a respective vane pivot axis (158) to selectively regulate the load compressor airflow (114) through the flow regulator assembly (152).

A19. The auxiliary power system (50) of paragraph A18, wherein each vane pivot axis (158) is at least substantially parallel to the central axis (106).

A20. The auxiliary power system (50) of paragraph A18, wherein each vane pivot axis (158) is at least substantially perpendicular to a/the central axis (106) of the APU (100).

A21. The auxiliary power system (50) of any of paragraphs A17-A20, wherein each inlet guide vane (154) of the plurality of inlet guide vanes (154) is configured to be selectively transitioned between a fully open configuration and a fully closed configuration via a plurality, optionally a continuous plurality, of intermediate configurations; wherein the load compressor airflow (114) is at least substantially unimpeded by the flow regulator assembly (152) when each inlet guide vane (154) is in the fully open configuration; and wherein the load compressor airflow (114) is at least substantially blocked by the flow regulator assembly (152) when each inlet guide vane (154) is in the fully closed configuration.

A22. The auxiliary power system (50) of any of paragraphs A1-A21, further comprising an exhaust outlet (120) configured to direct an exhaust flow (116) away from a/the powerhead turbine (148).

A23. The auxiliary power system (50) of paragraph A22, wherein the exhaust flow (116) includes, and optionally is, a portion, and optionally an entirety, of the engine airflow (112) downstream of a/the combustion chamber (142).

A24. The auxiliary power system (50) of any of paragraphs A22-A23, wherein the exhaust flow (116) includes, and optionally is, a portion, and optionally an entirety, of the fuel flow (144) downstream of the combustion chamber (142).

A25. The auxiliary power system (50) of any of paragraphs A22-A24, further comprising an exhaust gas temperature (EGT) sensor (122) configured to measure an EGT of the exhaust flow (116) and configured to generate and transmit an EGT signal (124) to the APU controller (200), wherein the EGT signal (124) is based, at least in part, on the EGT.

A26. The auxiliary power system (50) of paragraph A25, wherein the flow regulator command (210) is based, at least in part, on the EGT signal (124).

A27. The auxiliary power system (50) of any of paragraphs A25-A26, wherein the EGT sensor (122) includes, and optionally is, one or more of an EGT thermocouple and an EGT resistance temperature detector.

A28. The auxiliary power system (50) of any of paragraphs A1-A27, further comprising a fuel pump (146) configured to regulate a/the fuel flow (144) delivered to a/the combustion chamber (142).

A29. The auxiliary power system (50) of paragraph A28, wherein the APU controller (200) is configured to generate and transmit a fuel pump command (212) to the fuel pump (146) to selectively control a flow rate of the fuel flow (144) produced by the fuel pump (146).

A30. The auxiliary power system (50) of paragraph A29, wherein the fuel pump command (212) is based, at least in part, on a measured rotational speed of one or more of the load compressor (150), a/the shaft (160), a/the powerhead compressor (140), and a/the powerhead turbine (148).

A31. The auxiliary power system (50) of any of paragraphs A29-A30, wherein the fuel pump command (212) is based, at least in part, on one or more of the BAT signal (134) and a/the EGT signal (124).

A32. The auxiliary power system (50) of any of paragraphs A1-A31, wherein the APU controller (200) is configured to generate a flow regulator command component associated with each of one or more of:
a difference between the BAT and a/the threshold BAT;
a difference between a/the EGT and a threshold EGT; and
a system demand associated with one or more systems of an aircraft; and
wherein the flow regulator command (210) is based, at least in part, on each flow regulator command component.

A33. The auxiliary power system (50) of paragraph A32, wherein the APU controller (200) is configured to generate each flow regulator command component via a respective proportional integral derivative (PID) algorithm that utilizes one or more of a respective proportional (P) gain value, a respective integral (I) gain value, and a respective derivative (D) gain value.

A34. The auxiliary power system (50) of paragraph A33, wherein one or more of the respective P-gain value, the respective I-gain value, and the respective D-gain value is predetermined.

A35. The auxiliary power system (50) of any of paragraphs A33-A34, wherein the APU controller (200) is configured to dynamically update one or more of the respective P-gain value, the respective I-gain value, and the respective D-gain value during utilization of the auxiliary power system (50).

A36. The auxiliary power system (50) of any of paragraphs A1-A35, wherein the APU (100) further includes a generator (162) configured to generate electrical power.

A37. The auxiliary power system (50) of any of paragraphs A1-A36, wherein the APU (100) further includes one or more rotational speed sensors (172), wherein each rotational speed sensor (172) is configured to measure a rotational speed of one or more components of the auxiliary power system (50).

A38. The auxiliary power system (50) of paragraph A37, wherein each rotational speed sensor (172) is configured to measure a/the rotational speed of one or more of the shaft (160), the powerhead compressor (140), the powerhead turbine (148), and the load compressor (150).

A39. The auxiliary power system (50) of any of paragraphs A37-A38, wherein each rotational speed sensor (172) is configured to generate and transmit a rotational speed signal (174) to the APU controller (200).

A40. The auxiliary power system (50) of paragraph A39, wherein the APU controller (200) is configured to generate one or more of the flow regulator command (210) and a/the fuel pump command (212) based, at least in part, on the rotational speed signal (174).

A41. The auxiliary power system (50) of any of paragraphs A1-A40, wherein the BAT sensor includes a BAT sensor suite (133) that includes:
(i) a BAT magnitude sensor (170) in thermal communication with the bleed air flow, wherein the BAT magnitude sensor is configured to generate a BAT magnitude sensor signal (176) that is indicative of the BAT; and
(ii) a BAT thermal switch (180) in thermal communication with the bleed air flow, wherein the BAT thermal switch is configured to generate a, or a binary, BAT thermal switch signal, optionally wherein the BAT thermal switch signal has a, or a single, low-temperature output value when the BAT is less than a threshold BAT range, and further optionally wherein the BAT thermal switch has a, or a single, high-temperature output value, which differs from the low-temperature output value, when the BAT is greater than the threshold BAT range;
wherein the BAT signal is based, at least in part, on at least one of the BAT magnitude sensor signal and the BAT thermal switch signal.

A42. The auxiliary power system (50) of paragraph A41, wherein the BAT magnitude sensor includes at least one of:
(i) an analog BAT magnitude sensor;
(ii) a digital BAT magnitude sensor;
(iii) a continuous BAT magnitude sensor;
(iv) a BAT magnitude-sensing thermocouple;

(v) a BAT magnitude-sensing resistance thermal detector; and (vi) a BAT magnitude-sensing thermistor.

A43. The auxiliary power system (50) of any of paragraphs A41-A42, wherein the BAT thermal switch includes at least one of:

(i) a BAT thermal cutoff switch;

(ii) a normally closed BAT thermal switch;

(iii) a normally open BAT thermal switch;

(iv) a bistable BAT thermal switch;

(v) a bimetallic BAT thermal switch;

(vi) a mechanical BAT thermal switch; and (vii) a solid-state thermal switch.

A44. The auxiliary power system (50) of any of paragraphs A41-A43, wherein the BAT sensor suite includes a plurality of BAT magnitude sensors, wherein each BAT magnitude sensor of the plurality of BAT magnitude sensors is configured to generate a corresponding BAT magnitude sensor signal (176) indicative of a corresponding BAT magnitude measurement, and further wherein the BAT signal is based, at least in part, on at least one corresponding BAT magnitude sensor signal of at least one BAT magnitude sensor of the plurality of BAT magnitude sensors.

A45. The auxiliary power system (50) of paragraph A44, wherein the BAT signal is based, at least in part, on at least one of:

(i) an average of the corresponding BAT magnitude measurement from each BAT magnitude sensor of the plurality of BAT magnitude sensors;

(ii) a mean of the corresponding BAT magnitude measurement from each BAT magnitude sensor of the plurality of BAT magnitude sensors;

a median of the corresponding BAT magnitude measurement from each BAT magnitude sensor of the plurality of BAT magnitude sensors;

(iv) a minimum corresponding BAT magnitude measurement from the plurality of BAT magnitude sensors;

(v) a maximum corresponding BAT magnitude measurement from the plurality of BAT magnitude sensors; and (vi) a linear combination of the corresponding BAT magnitude measurement from each BAT magnitude sensor of the plurality of BAT magnitude sensors.

A46. The auxiliary power system (50) of any of paragraphs A41-A45, wherein the BAT sensor suite further includes a BAT signal processor (190) configured to process the BAT magnitude sensor signal and the BAT thermal switch signal.

A47. The auxiliary power system (50) of paragraph A46, wherein at least one of:

(i) the BAT signal processor is included within a BAT sensor suite package that includes the BAT magnitude sensor and the BAT thermal switch; and (ii) the BAT signal processor is included within the APU controller.

A48. The auxiliary power system (50) of any of paragraphs A46-A47, wherein the BAT signal processor is configured to verify a validity of the BAT magnitude sensor signal via a comparison between the BAT magnitude sensor signal and the BAT thermal switch signal.

A49. The auxiliary power system (50) of any of paragraphs A46-A48, wherein the BAT signal processor is configured to:

(i) determine that the BAT magnitude sensor signal is valid when the BAT magnitude sensor signal is consistent with the BAT thermal switch signal; and (ii) determine that the BAT magnitude sensor signal is invalid when the BAT magnitude sensor signal is inconsistent with the BAT thermal switch signal.

A50. The auxiliary power system (50) of any of paragraphs A46-A49, wherein the BAT signal processor is configured to at least one of:

(i) determine that the BAT magnitude sensor signal is valid when the BAT magnitude sensor signal and the BAT thermal switch signal both indicate that the BAT is less than the threshold BAT range;

(ii) determine that the BAT magnitude sensor signal is valid when the BAT magnitude sensor signal and the BAT thermal switch signal both indicate that the BAT is greater than the threshold BAT;

(iii) determine that the BAT magnitude sensor signal is invalid when the BAT magnitude sensor signal indicates that the BAT is greater than the threshold BAT range and the BAT thermal switch signal indicates that the BAT is less than the threshold BAT range; and (iv) determine that the BAT magnitude sensor signal is invalid when the BAT magnitude sensor signal indicates that the BAT is less than the threshold BAT range, and the BAT thermal switch signal indicates that the BAT is greater than the threshold BAT range.

A51. The auxiliary power system (50) of any of paragraphs A48-A50, wherein, upon determining that the BAT magnitude sensor signal is invalid, the BAT signal processor is configured to generate a failure notification (192) indicative of failure of the BAT sensor suite.

B1. A method of utilizing an auxiliary power system (50) to regulate a bleed air temperature (BAT) of a bleed air flow (118) generated by an auxiliary power unit (APU) (100), the method comprising:

compressing a load compressor airflow (114) to generate the bleed air flow (118);

measuring the BAT with a BAT sensor (132);

generating a BAT signal (134) with the BAT sensor (132), wherein the generating the BAT signal (134) is based, at least in part, on the BAT;

transmitting the BAT signal (134) to an APU controller (200);

optionally generating a flow regulator command (210) with the APU controller (200), wherein the generating the flow regulator command (210) is based, at least in part, on the BAT signal (134);

optionally transmitting the flow regulator command (210) to a flow regulator assembly (152); and optionally controlling the flow regulator assembly (152) to regulate a flow rate of the load compressor airflow (114), wherein the controlling the flow regulator assembly (152) is based, at least in part, on the flow regulator command (210).

B2. The method of paragraph B1, wherein the flow regulator assembly (152) includes a plurality of inlet guide vanes (154) and an inlet guide vane actuator (156), and wherein the controlling the flow regulator assembly (152) includes selectively actuating the plurality of inlet guide vanes (154) with the inlet guide vane actuator (156) responsive to the flow regulator command (210).

B3. The method of any of paragraphs B1-B2, further comprising:

combusting a mixture of an engine airflow (112) and a fuel flow (144) to generate an exhaust flow (116);

measuring an exhaust gas temperature (EGT) of the exhaust flow (116) with an EGT sensor (122);

generating an EGT signal (124) with the EGT sensor (122), wherein the generating the EGT signal (124) is based, at least in part, on the EGT; and transmitting the EGT signal (124) to the APU controller (200);

wherein the generating the flow regulator command (210) is based, at least in part, on the EGT signal (124).

B4. The method of any of paragraphs B1-B3, wherein the generating the flow regulator command (210) includes:

calculating a flow regulator command component associated with each of one or more of:
  a difference between the BAT and a threshold BAT;
  a difference between a/the EGT and a threshold EGT; and
  a system demand associated with one or more systems of an aircraft; and combining each flow regulator command component to produce the flow regulator command (210).

B5. The method of paragraph B4, wherein the calculating each flow regulator command component includes employing one or more of:
(i) a respective proportional-integral-derivative (PID) algorithm;
(ii) a respective multivariable control algorithm; and
(iii) a respective minimum-variance control algorithm.

B6. The method of paragraph B5, wherein the calculating each flow regulator command component includes employing the respective PID algorithm, and wherein the respective PID algorithm utilizes one or more of a respective proportional (P) gain value, a respective integral (I) gain value, and a respective derivative (D) gain value.

B7. The method of paragraph B6, wherein one or more of the respective P-gain value, the respective I-gain value, and the respective D-gain value is predetermined.

B8. The method of any of paragraphs B6-B7, wherein the calculating each flow regulator command component further includes dynamically updating one or more of the respective P-gain value, the respective I-gain value, and the respective D-gain value.

B9. The method of any of paragraphs B1-B8, further comprising:

generating a fuel pump command (212) with the APU controller (200); and transmitting the fuel pump command (212) to a fuel pump (146) to regulate a flow rate of a/the fuel flow (144).

B10. The method of paragraph B9, wherein the generating the fuel pump command (212) is based, at least in part, on a rotational speed signal (174) generated by a rotational speed sensor (172).

B11. The method of any of paragraphs B9-B10 when dependent from paragraph B3, wherein the combusting the mixture of the engine airflow (112) and the fuel flow (144) to generate the exhaust flow (116) is based, at least in part, on the generating the fuel pump command (212).

B12. The method of any of paragraphs B1-B11, wherein the auxiliary power system (50) is the auxiliary power system (50) of any of paragraphs A1-A51.

B13. The method of any of paragraphs B1-B12, wherein the BAT sensor includes a BAT sensor suite (133) that includes a BAT magnitude sensor (170) and a BAT thermal switch (180), wherein the measuring the BAT includes:
(i) exposing the BAT magnitude sensor to the bleed air flow and generating a BAT magnitude sensor signal (176) that is indicative of the BAT; and
(ii) exposing the BAT thermal switch to the bleed air flow and generating a BAT thermal switch signal (182), wherein the BAT thermal switch signal defines a low-temperature output value when the BAT is less than a threshold BAT range, and further wherein the BAT thermal switch signal defines a high-temperature output value, which differs from the low-temperature output value, when the BAT is greater than the threshold BAT range; and wherein the BAT signal is based, at least in part, on at least one of the BAT magnitude sensor signal and the BAT thermal switch signal.

B14. The method of paragraph B13, wherein the BAT sensor suite includes a plurality of BAT magnitude sensors, wherein each BAT magnitude sensor of the plurality of BAT magnitude sensors is configured to generate a corresponding BAT magnitude sensor signal indicative of a corresponding BAT magnitude measurement, and further wherein the generating the BAT signal includes generating the BAT signal is based, at least in part, on at least one corresponding BAT magnitude sensor signal of at least one BAT magnitude sensor of the plurality of BAT magnitude sensors.

B15. The method of paragraph B14, wherein the generating the BAT signal includes generating the BAT signal based, at least in part, on at least one of:
(i) an average of the corresponding BAT magnitude measurement from each BAT magnitude sensor of the plurality of BAT magnitude sensors;
(ii) a mean of the corresponding BAT magnitude measurement from each BAT magnitude sensor of the plurality of BAT magnitude sensors;
(iii) a median of the corresponding BAT magnitude measurement from each BAT magnitude sensor of the plurality of BAT magnitude sensors;
(iv) a minimum corresponding BAT magnitude measurement from the plurality of BAT magnitude sensors;
(v) a maximum corresponding BAT magnitude measurement from the plurality of BAT magnitude sensors; and
(vi) a linear combination of the corresponding BAT magnitude measurement from each BAT magnitude sensor of the plurality of BAT magnitude sensors.

B16. The method of any of paragraphs B13-B15, wherein the method further includes verifying a validity of the BAT magnitude sensor signal via a comparison between the BAT magnitude sensor signal and the BAT thermal switch signal.

B17. The method of any of paragraphs B13-B16, wherein the method further includes at least one of:
(i) determining that the BAT signal is valid when the BAT magnitude sensor signal is consistent with the BAT thermal switch signal; and
(ii) determining that the BAT signal is invalid when the BAT magnitude sensor signal is inconsistent with the BAT thermal switch signal.

B18. The method of any of paragraphs B13-B17, wherein the method further includes at least one of:
(i) determining that the BAT signal is valid when the BAT magnitude sensor signal and the BAT thermal switch signal both indicate that the BAT is less than the threshold BAT range;
(ii) determining that the BAT signal is valid when the BAT magnitude sensor signal and the BAT thermal switch signal both indicate that the BAT is greater than the threshold BAT;
(iii) determining that the BAT signal is invalid when the BAT magnitude sensor signal indicates that the BAT is greater than the threshold BAT range, and the BAT thermal switch signal indicates that the BAT is less than the threshold BAT range; and (iv) determining that the BAT signal is invalid when the BAT magnitude sensor signal indicates that the BAT is less than the threshold BAT range and the BAT thermal switch signal indicates that the BAT is greater than the threshold BAT range.

B19. The method of paragraph B18, wherein, upon determining that the BAT signal is invalid, the method further includes generating a failure notification indicative of failure of the BAT sensor suite.

B20. The method of any of paragraphs B1-B19, wherein the APU defines a bleed air outlet (128), wherein the auxiliary power system is included within an aircraft that includes a bleed air consumer (60), which is configured to receive at least a subset of the bleed air flow from the APU, and a bleed air conduit (130), which is configured to convey the bleed air flow from the bleed air outlet to the bleed air consumer, wherein the BAT sensor is positioned at a remote BAT location (132c) that is outside the bleed air outlet of the APU.

B21. The method of paragraph B20, wherein the method includes regulating an outlet BAT of the bleed air flow at the bleed air outlet, based, at least in part, on the BAT of the bleed air flow at the remote BAT location.

B22. The method of any of paragraphs B20-B21, wherein the method includes regulating a consumer BAT of the bleed air flow at the bleed air consumer, based, at least in part, on the BAT of the bleed air flow at the remote BAT location.

B23. The method of any of paragraphs B20-B22, wherein the method includes regulating a remote BAT of the bleed air flow at the remote BAT location, based, at least in part, on the BAT of the bleed air flow at the remote BAT location.

B24. The method of any of paragraphs B1-B23, wherein the aircraft includes a plurality of spaced-apart BAT sensors (132).

B25. The method of paragraph B24, wherein the method includes regulating the BAT of the bleed air flow based, at least in part, on at least one of:
(i) a given BAT signal (134) of a given BAT sensor (132) of the plurality of spaced-apart BAT sensors; and
(ii) a plurality of BAT signals (134) generated by at least a subset of the plurality of spaced-apart BAT sensors.

B26. The method of any of paragraphs B24-B25, wherein the method further includes verifying a validity of a first BAT signal (134) from a first BAT sensor (132) of the plurality of BAT sensors based, at least in part, upon a comparison of the first BAT signal to a second BAT signal (134) from a second BAT sensor (132) of the plurality of BAT sensors.

B27. The method of paragraph B26, wherein the verifying includes one of:
(i) determining that the first BAT signal is valid when the first BAT signal corresponds to a first BAT that is within a threshold temperature differential of a first calculated BAT that is calculated based, at least in part, on the second BAT signal; and
(ii) determining that the first BAT signal has questionable validity when the first BAT differs from the first calculated BAT by more than the threshold temperature differential.

B28. The method of paragraph B27, wherein the threshold temperature differential includes temperature differentials of 1° C., 2° C., 3° C., 4° C., 5° C., 6° C., 8° C., or 10° C.

B29. The method of any of paragraphs B27-B28, wherein, when the verifying includes determining that the first BAT signal has questionable validity, the verifying further includes verifying a validity of both the first BAT signal and the second BAT signal based, at least in part, upon a comparison of the first BAT signal and the second BAT signal to a third BAT signal (134) from a third BAT sensor (132) of the plurality of BAT sensors.

B30. The method of any of paragraphs B1-B29, wherein the method includes calculating a calculated BAT of the bleed air flow at a calculation location based, at least in part, on the BAT signal (134).

B31. The method of paragraph B30, wherein the method further includes regulating a calculation location BAT of the bleed air flow at the calculation location based, at least in part, on the calculated BAT.

B32. The method of any of paragraphs B30-B31, wherein the method includes calculating the calculated BAT of the bleed air flow at the calculation location based, at least in part, on at least one of:
(i) a distance between a BAT sensor location of the BAT sensor, and the calculation location as measured along a length of a/the bleed air conduit (130) that interconnects the BAT sensor location and the calculation location;
(ii) an ambient temperature;
(iii) a bleed air flow rate of the bleed air flow; and
(iv) a direction of bleed air flow between the BAT sensor location and the calculation location.

C1. An aircraft (10) comprising an airframe (18) that structurally supports the auxiliary power system (50) of any of paragraphs A1-A51.

C2. The aircraft (10) of paragraph C1, wherein the APU defines a bleed air outlet (128).

C3. The aircraft (10) of paragraph C2, wherein the BAT sensor is at least one of:
(i) positioned within the bleed air outlet; and
(ii) positioned at most a threshold outlet distance of the bleed air outlet, optionally wherein the threshold outlet distance is 2 meters (m), 1.75 m, 1.5 m, 1.25 m, 1 m, 0.75 m, 0.5 m, 0.25 m, or 0.1 m.

C4. The aircraft (10) of any of paragraphs C2-C3, wherein the aircraft includes a bleed air consumer (60), which is configured to receive at least a subset of the bleed air flow from the APU, and a bleed air conduit (130), which is configured to convey the bleed air flow from the bleed air outlet to the bleed air consumer.

C5. The aircraft (10) of paragraph C4, wherein the BAT sensor is positioned at a remote BAT location that is outside the bleed air outlet of the APU.

C6. The aircraft (10) of paragraph C5, wherein the BAT sensor is positioned within the bleed air conduit.

C7. The aircraft (10) of any of paragraphs C5-C6, wherein the BAT sensor is at least one of:
(i) proximate the bleed air consumer relative to the APU;
(ii) distal the APU relative to the bleed air consumer; and
(iii) operatively attached to the bleed air consumer.

C8. The aircraft (10) of any of paragraphs C5-C7, wherein the BAT sensor is at least a threshold conduit distance from the bleed air outlet, optionally wherein the threshold conduit distance is 1 m, 1.5 m, 2 m, 2.5 m, 3 m, 3.5 m, 4 m, 4.5 m, 5 m, 5.5 m, 6 m, 8 m, 10 m, 15 m, or 20 m.

C9. The aircraft (10) of any of paragraphs C5-C8, wherein the APU is configured to regulate an outlet BAT of the bleed air flow, at the bleed air outlet, based, at least in part, on the BAT of the bleed air flow at the remote BAT location.

C10. The aircraft (10) of any of paragraphs C5-C9, wherein the APU is configured to regulate a consumer BAT of the bleed air flow, at the bleed air consumer, based, at least in part, on the BAT of the bleed air flow at the remote BAT location.

C11. The aircraft (10) of any of paragraph C5-C10, wherein the APU is configured to regulate a remote BAT of the bleed air flow at the remote BAT location, based, at least in part, on the BAT of the bleed air flow at the remote BAT location.

C12. The aircraft (10) of any of paragraphs C4-C11, wherein the aircraft includes a plurality of spaced-apart BAT sensors (132).

C13. The aircraft (10) of paragraph C12, wherein at least one of:
(i) at least a subset of the plurality of spaced-apart BAT sensors is spaced-apart within the bleed air conduit;
(ii) at least one BAT sensor of the plurality of spaced-apart BAT sensors is operatively attached to the APU;
(iii) at least one BAT sensor of the plurality of spaced-apart BAT sensors is configured to measure the BAT at the APU;
(iv) at least one BAT sensor of the plurality of spaced-apart BAT sensors is operatively attached to the bleed air consumer; and
(v) at least one BAT sensor of the plurality of spaced-apart BAT sensors is configured to measure the BAT at the bleed air consumer.

C14. The aircraft (10) of any of paragraphs C12-C13, wherein the APU controller is configured to regulate the BAT of the bleed air flow based, at least in part, on at least one of:
(i) a given BAT signal (134) of a given BAT sensor (132) of the plurality of spaced-apart BAT sensors; and
(ii) a plurality of BAT signals (134) generated by at least a subset of the plurality of spaced-apart BAT sensors.

C15. The aircraft (10) of any of paragraphs C12-C14, wherein the APU controller is configured to verify a validity of a first BAT signal (134) from a first BAT sensor (132) of the plurality of BAT sensors based, at least in part, upon a comparison of the first BAT signal to a second BAT signal (134) from a second BAT sensor (132) of the plurality of BAT sensors.

C16. The aircraft (10) of paragraph C15, wherein the APU controller is configured to one of:
(i) determine that the first BAT signal is valid when the first BAT signal corresponds to a first BAT that is within a threshold temperature differential of a first calculated BAT that is calculated based, at least in part, on the second BAT signal; and
(ii) determine that the first BAT signal has questionable validity when the first BAT differs from the first calculated BAT by more than the threshold temperature differential.

C17. The aircraft (10) of paragraph C16, wherein the threshold temperature differential includes temperature differentials of 1° C., 2° C., 3° C., 4° C., 5° C., 6° C., 8° C., or 10° C.

C18. The aircraft (10) of any of paragraphs C16-C17, wherein, upon determining that the first BAT signal has questionable validity, the APU controller further is configured to verify a validity of both the first BAT signal and the second BAT signal based, at least in part, upon a comparison of the first BAT signal and the second BAT signal to a third BAT signal (134) from a third BAT sensor (132) of the plurality of BAT sensors.

C19. The aircraft (10) of any of paragraphs C4-C18, wherein the aircraft includes a plurality of spaced-apart bleed air consumers (60).

C20. The aircraft (10) of paragraph C19, wherein the APU controller is configured to regulate the BAT of the bleed air flow such that at least one of:
(i) the BAT at a selected bleed air consumer (60) of the plurality of spaced-apart bleed air consumers is less than a/the threshold BAT; and
(ii) the BAT at each bleed air consumer within at least a subset of the plurality of spaced-apart bleed air consumers is less than a corresponding threshold BAT.

C21. The aircraft (10) of any of paragraphs C1-C20, wherein the APU controller is configured to calculate a calculated BAT of the bleed air flow at a calculation location based, at least in part, on the BAT signal.

C22. The aircraft (10) of paragraph C21, wherein the APU is configured to regulate a calculation location BAT of the bleed air flow at the calculation location based, at least in part, on the calculated BAT.

C23. The aircraft (10) of any of paragraphs C21-C22, wherein the APU controller is configured to calculate the calculated BAT of the bleed air flow at the calculation location based, at least in part, on at least one of:
(i) a distance between a BAT sensor location of the BAT sensor, and the calculation location as measured along a length of a/the bleed air conduit that interconnects a BAT sensor location and the calculation location;
(ii) an ambient temperature;
(iii) a bleed air flow rate of the bleed air flow; and
(iv) a direction of bleed air flow between the BAT sensor location and the calculation location.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a fluid flow that is at least substantially formed from a component flow includes a fluid flow for which at least 75% of the fluid flow is formed from the component flow and also includes a fluid flow that is completely formed from the component flow. As another example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

The invention claimed is:
1. An aircraft comprising;
an airframe; and
an auxiliary power system structurally supported by the airframe and configured to regulate a bleed air temperature (BAT) of a bleed air flow, the auxiliary power system comprising:
(i) an auxiliary power unit (APU) configured to generate the bleed air flow;
(ii) an APU controller configured to receive and transmit signals; and
(iii) a BAT sensor configured to measure the BAT of the bleed air flow and configured to generate a BAT signal, wherein the BAT signal is based, at least in part, on the BAT;
wherein the APU defines a bleed air outlet;
wherein the aircraft includes a bleed air consumer, which is configured to receive at least a subset of the bleed air flow from the APU, and a bleed air conduit, which is configured to convey the bleed air flow from the bleed air outlet to the bleed air consumer;

wherein the BAT sensor is positioned at a remote BAT location that is spaced-apart from the bleed air outlet of the APU;

wherein the APU controller is configured to calculate a calculated BAT of the bleed air flow at a calculation location based, at least in part, on the BAT signal; and wherein the calculation location is spaced-apart from the remote BAT location of the BAT sensor.

2. The aircraft of claim 1, wherein the BAT sensor is at least one of:
(i) proximate the bleed air consumer relative to the APU;
(ii) distal the APU relative to the bleed air consumer; and
(iii) operatively attached to the bleed air consumer.

3. The aircraft of claim 1, wherein the APU is configured to at least one of:
(i) regulate an outlet BAT of the bleed air flow at the bleed air outlet, based, at least in part, on the BAT of the bleed air flow at the remote BAT location;
regulate a consumer BAT of the bleed air flow at the bleed air consumer, based, at least in part, on the BAT of the bleed air flow at the remote BAT location; and
(iii) regulate a remote BAT of the bleed air flow at the remote BAT location, based, at least in part, on the BAT of the bleed air flow at the remote BAT location.

4. The aircraft of claim 1, wherein the aircraft includes a plurality of spaced-apart BAT sensors.

5. The aircraft of claim 4, wherein at least one of:
(i) at least a subset of the plurality of spaced-apart BAT sensors is spaced-apart within the bleed air conduit;
at least one BAT sensor of the plurality of spaced-apart BAT sensors is operatively attached to the APU;
(iii) at least one BAT sensor of the plurality of spaced-apart BAT sensors is configured to measure the BAT at the APU;
(iv) at least one BAT sensor of the plurality of spaced-apart BAT sensors is operatively attached to the bleed air consumer; and
(v) at least one BAT sensor of the plurality of spaced-apart BAT sensors is configured to measure the BAT at the bleed air consumer.

6. The aircraft of claim 4, wherein the APU controller is configured to regulate the BAT of the bleed air flow based, at least in part, on at least one of:
(i) a given BAT signal of a given BAT sensor of the plurality of spaced-apart BAT sensors; and
(ii) a plurality of BAT signals generated by at least a subset of the plurality of spaced-apart BAT sensors.

7. The aircraft of claim 4, wherein the APU controller is configured to verify a validity of a first BAT signal from a first BAT sensor of the plurality of BAT sensors based, at least in part, upon a comparison of the first BAT signal to a second BAT signal from a second BAT sensor of the plurality of BAT sensors.

8. The aircraft of claim 1, wherein the APU is configured to regulate a calculation location BAT of the bleed air flow at the calculation location based, at least in part, on the calculated BAT.

9. The aircraft of claim 1, wherein the APU controller is configured to calculate the calculated BAT of the bleed air flow at the calculation location based, at least in part, on at least one of:
(i) a distance between a BAT sensor location of the BAT sensor, and the calculation location as measured along a length of the bleed air conduit that interconnects the BAT sensor location and the calculation location;
(ii) an ambient temperature;
(iii) a bleed air flow rate of the bleed air flow; and (iv) a direction of bleed air flow between the BAT sensor location and the calculation location.

10. A method of utilizing an auxiliary power system to regulate a bleed air temperature (BAT) of a bleed air flow generated by an auxiliary power unit (APU), the method comprising:
compressing a load compressor airflow to generate the bleed air flow;
measuring the BAT with a BAT sensor;
generating a BAT signal with the BAT sensor, wherein the generating the BAT signal is based, at least in part, on the BAT; and
transmitting the BAT signal to an APU controller;
wherein the APU defines a bleed air outlet;
wherein the auxiliary power system is included within an aircraft that includes a bleed air consumer, which is configured to receive at least a subset of the bleed air flow from the APU, and a bleed air conduit, which is configured to convey the bleed air flow from the bleed air outlet to the bleed air consumer;
wherein the BAT sensor is positioned at a remote BAT location that is spaced-apart from the bleed air outlet of the APU;
wherein the method includes calculating a calculated BAT of the bleed air flow at a calculation location based, at least in part, on the BAT signal; and
wherein the calculation location is spaced-apart from the remote BAT location of the BAT sensor.

11. The method of claim 10, wherein the method includes at least one of:
(i) regulating an outlet BAT of the bleed air flow at the bleed air outlet, based, at least in part, on the BAT of the bleed air flow at the remote BAT location;
(ii) regulating a consumer BAT of the bleed air flow at the bleed air consumer, based, at least in part, on the BAT of the bleed air flow at the remote BAT location; and
(iii) regulating a remote BAT of the bleed air flow at the remote BAT location, based, at least in part, on the BAT of the bleed air flow at the remote BAT location.

12. The method of claim 10, wherein the aircraft includes a plurality of spaced-apart BAT sensors, wherein the method includes regulating the BAT of the bleed air flow based, at least in part, on at least one of:
(i) a given BAT signal of a given BAT sensor of the plurality of spaced-apart BAT sensors; and
(ii) a plurality of BAT signals generated by at least a subset of the plurality of spaced-apart BAT sensors.

13. The method of claim 12, wherein the method further includes verifying a validity of a first BAT signal from a first BAT sensor of the plurality of BAT sensors based, at least in part, upon a comparison of the first BAT signal to a second BAT signal from a second BAT sensor of the plurality of BAT sensors.

14. The method of claim 10, wherein the method includes the calculating the calculated BAT of the bleed air flow at the calculation location based, at least in part, on at least one of:
(i) a distance between a BAT sensor location of the BAT sensor, and the calculation location as measured along a length of the bleed air conduit that interconnects the BAT sensor location and the calculation location;
(ii) an ambient temperature;
(iii) a bleed air flow rate of the bleed air flow; and
(iv) a direction of bleed air flow between the BAT sensor location and the calculation location.

15. An auxiliary power system configured to regulate a bleed air temperature (BAT) of a bleed air flow, comprising:

an auxiliary power unit (APU) configured to generate the bleed air flow;

an APU controller configured to receive and transmit signals; and a BAT sensor suite configured to measure the BAT of the bleed air flow and configured to generate a BAT signal, wherein the BAT signal is based, at least in part, on the BAT, and further wherein the BAT sensor suite includes:

(i) a BAT magnitude sensor in thermal communication with the bleed air flow, wherein the BAT magnitude sensor is configured to generate a BAT magnitude sensor signal that is indicative of the BAT; and (ii) a BAT thermal switch in thermal communication with the bleed air flow, wherein the BAT thermal switch is configured to generate a BAT thermal switch signal that has a low-temperature output value when the BAT is less than a threshold BAT range and a high-temperature output value, which differs from the low-temperature output value, when the BAT is greater than the threshold BAT range; and wherein the BAT signal is based, at least in part, on at least one of the BAT magnitude sensor signal and the BAT thermal switch signal.

16. The auxiliary power system of claim 15, wherein the BAT sensor suite includes a plurality of BAT magnitude sensors, wherein each BAT magnitude sensor of the plurality of BAT magnitude sensors is configured to generate a corresponding BAT magnitude sensor signal indicative of a corresponding BAT magnitude measurement, and further wherein the BAT signal is based, at least in part, on at least one corresponding BAT magnitude sensor signal of at least one BAT magnitude sensor of the plurality of BAT magnitude sensors, and further wherein the BAT signal is based, at least in part, on at least one of:

(i) an average of the corresponding BAT magnitude measurement from each BAT magnitude sensor of the plurality of BAT magnitude sensors;

(ii) a mean of the corresponding BAT magnitude measurement from each BAT magnitude sensor of the plurality of BAT magnitude sensors;

(iii) a median of the corresponding BAT magnitude measurement from each BAT magnitude sensor of the plurality of BAT magnitude sensors;

(iv) a minimum corresponding BAT magnitude measurement from the plurality of BAT magnitude sensors;

(v) a maximum corresponding BAT magnitude measurement from the plurality of BAT magnitude sensors; and (vi) a linear combination of the corresponding BAT magnitude measurement from each BAT magnitude sensor of the plurality of BAT magnitude sensors.

17. The auxiliary power system of claim 15, wherein the BAT sensor suite further includes a BAT signal processor configured to process the BAT magnitude sensor signal and the BAT thermal switch signal, wherein the BAT signal processor is configured to verify a validity of the BAT magnitude sensor signal via a comparison between the BAT magnitude sensor signal and the BAT thermal switch signal.

18. An aircraft comprising an airframe that structurally supports the auxiliary power system of claim 15.

19. The aircraft of claim 18, wherein:

(i) the auxiliary power unit (APU) defines a bleed air outlet; and (ii) the BAT sensor suite is positioned at a remote BAT location that is spaced-apart from the bleed air outlet.

20. A method of utilizing an auxiliary power system to regulate a bleed air temperature (BAT) of a bleed air flow generated by an auxiliary power unit (APU), the method comprising:

compressing a load compressor airflow to generate the bleed air flow;

measuring the BAT with a BAT sensor suite;

generating a BAT signal with the BAT sensor suite, wherein the generating the BAT signal is based, at least in part, on the BAT; and transmitting the BAT signal to an APU controller;

wherein the BAT sensor suite includes a BAT magnitude sensor and a BAT thermal switch; and wherein the measuring the BAT includes:

(i) exposing the BAT magnitude sensor to the bleed air flow and generating a BAT magnitude sensor signal that is indicative of the BAT; and (ii) exposing the BAT thermal switch to the bleed air flow and generating a BAT thermal switch signal, wherein the BAT thermal switch signal defines a low-temperature output value when the BAT is less than a threshold BAT range, and further wherein the BAT thermal switch signal defines a high-temperature output value, which differs from the low-temperature output value, when the BAT is greater than the threshold BAT range; and further wherein the BAT signal is based, at least in part, on at least one of the BAT magnitude sensor signal and the BAT thermal switch signal.

* * * * *